Feb. 26, 1957 E. L. VIBBARD 2,782,985

TAPE CONTROL ARRANGEMENT FOR COMPUTER

Original Filed Dec. 17, 1946 17 Sheets-Sheet 1

INVENTOR
E. L. VIBBARD
BY J. W. Schmied
ATTORNEY

TAPE CONTROL ARRANGEMENT FOR COMPUTER

Original Filed Dec. 17, 1946 17 Sheets-Sheet 2

INVENTOR
E. L. VIBBARD
BY
J.W. Schmied
ATTORNEY

Feb. 26, 1957 E. L. VIBBARD 2,782,985

TAPE CONTROL ARRANGEMENT FOR COMPUTER

Original Filed Dec. 17, 1946 17 Sheets-Sheet 3

INVENTOR
E. L. VIBBARD
BY J. W. Schmied
ATTORNEY

INVENTOR
E. L. VIBBARD
BY J. W. Schmied
ATTORNEY

INVENTOR
E. L. VIBBARD
BY
J. W. Schmied
ATTORNEY

INVENTOR
E. L. VIBBARD
BY
J W Schmied
ATTORNEY

INVENTOR
E. L. VIBBARD
BY J W Schmied
ATTORNEY

Feb. 26, 1957 E. L. VIBBARD 2,782,985

TAPE CONTROL ARRANGEMENT FOR COMPUTER

Original Filed Dec. 17, 1946 17 Sheets-Sheet 8

INVENTOR
E. L. VIBBARD
BY
J W Schmied
ATTORNEY

INVENTOR
E. L. VIBBARD
BY J W Schmied
ATTORNEY

TAPE CONTROL ARRANGEMENT FOR COMPUTER

Original Filed Dec. 17, 1946 17 Sheets-Sheet 10

INVENTOR
E. L. VIBBARD
BY J. W. Schmied
ATTORNEY

TAPE CONTROL ARRANGEMENT FOR COMPUTER

Original Filed Dec. 17, 1946 17 Sheets-Sheet 11

INVENTOR
E. L. VIBBARD

BY

J W Schmied

ATTORNEY

Feb. 26, 1957 E. L. VIBBARD 2,782,985

TAPE CONTROL ARRANGEMENT FOR COMPUTER

Original Filed Dec. 17, 1946 17 Sheets-Sheet 12

INVENTOR
E. L. VIBBARD
BY J W Schmied
ATTORNEY

TAPE CONTROL ARRANGEMENT FOR COMPUTER

Original Filed Dec. 17, 1946 17 Sheets-Sheet 13

INVENTOR
E. L. VIBBARD

BY J. W. Schmied

ATTORNEY

INVENTOR
E. L. VIBBARD
BY
J W Schmied
ATTORNEY

INVENTOR
E. L. VIBBARD
BY
J W Schmied
ATTORNEY

Feb. 26, 1957 E. L. VIBBARD 2,782,985

TAPE CONTROL ARRANGEMENT FOR COMPUTER

Original Filed Dec. 17, 1946 17 Sheets-Sheet 16

INVENTOR
E. L. VIBBARD
BY J. W. Schmied
ATTORNEY

INVENTOR
E. L. VIBBARD
BY J. W. Schmied
ATTORNEY

United States Patent Office 2,782,985
Patented Feb. 26, 1957

1 2

2,782,985

TAPE CONTROL ARRANGEMENT FOR COMPUTER

Edward L. Vibbard, La Jolla, Calif., assignor to Bell Telephone Laboratories, Incorporated, New York, N. Y., a corporation of New York Original application December 17, 1946, Serial No. 716,827, now Patent No. 2,671,611, dated March 9, 1954. Divided and this application June 12, 1952, Serial No. 293,103

13 Claims. (Cl. 235—61)

This invention relates to calculators and particularly to electrical devices by which mathematical calculations may be carried out by the movement of simple electromagnetic means without the use of the gear trains, number wheels, cams or other such mechanical elements and is a division of application Serial No. 716,827, filed on December 17, 1946, now Patent No. 2,671,611, granted March 9, 1954.

An object of the invention is to provide calculating means which will perform long and complicated operations in a minimum of time and with a minimum of apparatus.

The calculator in which the present invention is employed is known as a tape-controlled calculator adapted to perform extensive and complicated mechanical operations requiring such an intricate pattern of operations that its manipulation by hand in the manner of the old and familiar adding machines or other mechanical computers is possible but not practical. Hence the problems are planned and tapes are prepared which when put in the calculator will control the further automatic operation thereof for long periods of time, the results being calculated and then recorded in tabular form.

Operational orders, indices of standard and known information and problem data are recorded on various tapes in the form of perforations arranged in the various combinations of a permutation code similar to that employed in the printing telegraph art. In the operation of the calculator in which the present invention is employed a master or routine tape is provided to have general control of the sequence of operations of the calculator. The master control tape controls a complete cycle of calculating operations in accordance with a predetermined pattern in which there may be a great plurality of calculating cycles. The master control circuit issues orders each one of which upon completion terminates in the transmission to the master control circuit of a satisfaction signal which results in the advance of the routine or master tape and the transmission of the next order in sequence. The master or routine tape is in the form of an endless loop and normally or in the event of trouble, moves to an end-of-cycle position from which it advances to a new cycle.

An object of the present invention is the provision of a means to control the movement of an endless tape from any point reached during its movement to a given starting point in the least amount of time.

The calculator in which the present invention is employed is one in which the entry of every value is by way of a problem in multiplication. Addition is performed by entering an augend as a multiplicand with the automatic use of the digit one as a multiplier and thereafter entering one or more addends in the same manner, the addition becoming the result of an accumulation, a subtotal being produced upon the entry of each separate addend. Subtraction is performed in the same way as addition with the exception that the sign of the addend (now the subtrahend) is changed. Division is performed by entering the dividend in the same manner as an augend, that is, entering the dividend as a multiplicand with the automatic use of the digit one as a multiplier. Thereafter, the divisor is entered as a multiplicand with the use of different trial quotient digits as multipliers, numerous trials of different digits being made automatically until certain given conditions are satisfied. It then being firmly established that the entry of every problem is by way of an exercise in multiplication, it is to be understood that every calculation is actually an operation in addition. Multiplication consists in the addition of the tens and units digits of the products of the multiplicand digits by a single multiplier digit with the registration of the sum in a storing register awaiting accumulation with other such sums produced by successive multiplier digits properly shifted.

The calculation therefore is straightforward in nature and differs from the conventional prior art methods in that counting means are eliminated. Thus in multiplication, if a multiplier digit of 5 is used, the process is not a five times counted repetition of the summing of the multiplicand but rather a single straightforward summing operation under a condition set by relays representing the multiplier digit 5. In division, while repeated trials of different quotient digits are made the trials are not counted but only the nature of the result is noted so that when the remainder (the divisor times the trial quotient digit being used as a subtrahend and the dividend being used as a minuend) changes from a negative to a positive number the quotient digit used in that trial is recorded. What might be termed the approach from above, meaning the successive trials of lower values as quotient digits, eliminates both counting and recording of any information on unsuccessful trials.

One of the features of the calculating device though not claimed as a novel feature in this application is the means for stopping a calculation and giving an alarm when a difficulty is encountered coupled with timing means which if the difficulty is not remedied within a predetermined period will cause the calculation to be abandoned and another started.

One necessary step in starting a new calculation is to move the master index to its starting point. Since for a complicated problem this master index, which is in the form of an endless loop, may be of considerable length, means are provided to move it from the point reached to the beginning either by continuing its forward movement or reversing the direction of movement and running it back to the beginning. For this purpose, a special indicium is recorded midway in the tape and a device which will determine the direction of its movement, if and when it is to be returned quickly to the beginning, is operated. Then, if the mid-point has been passed it is obviously quicker to move the tape forwardly but if this mid-point has not yet been reached, it is by the same token obviously quicker to reverse the direction of movement and to move the tape backwardly. A feature of the invention is therefore a means to control the movement of an endless tape from any point reached to a given starting point in the direction of the shortest distance between such points.

The drawings consist of seventeen sheets having twenty-two figures, as follows:

Fig. 1 and Fig. 2 taken together with Fig. 1 placed above Fig. 2 is a flow chart indicating the manner in which the device of the present invention is operated;

Fig. 8 is a block diagram showing how Figs. 9 to 14, inclusive, may be placed to form a circuit diagram, in which:

Fig. 16 is a block diagram showing how Figs. 17, 18 and 19 may be placed to form a schematic circuit diagram to illustrate the operations when the device is recycled and particularly how the master tape is returned to its starting point over the shortest route, in which:

Fig. 17 shows a schematic representation of a tape transmitter;

Figs. 17 and 19 show the recycle circuits;

This application is a division of said Vibbard application which is one of a group of seven applications all based on the same arrangement. The Andrews-Vibbard application is a full and complete disclosure and includes a disclosure of the present invention, the other applications including the present divisional application and its copending parent application being abbreviated disclosures of certain features of the complete device, as follows:

| Applicant | Serial number | Filing date | Subject |
|---|---|---|---|
| Andrews-Vibbard | 716,680 | Dec. 17, 1946 | Automatic Calculator. |
| W. B. Strickler | 716,783 | Dec. 17, 1946 | Testing System, now Patent No. 2,692,728, granted October 26, 1954. |
| J. P. Juley | 716,793 | Dec. 17, 1946 | Switching Control System, now Patent No. 2,665,578, granted January 19, 1954. |
| O. Cesareo | 716,753 | Dec. 17, 1946 | Automatic Code Translating System, now Patent No. 2,625,328, granted January 13, 1953. |
| E. G. Andrews | 716,762 | Dec. 17, 1946 | Calculator Sign Control Circuit, now Patent No. 2,679,977, granted June 1, 1954. |
| Cesareo-Strickler | 716,754 | Dec. 17, 1946 | Automatic Calculator, now Patent No. 2,692,082, granted October 19, 1954. |

The device in which the present invention is incorporated is a calculator operated by electrical circuit change in which each new circuit operation is dependent upon the successful completion of a previous operation. It consists essentially of a calculating arrangement, a plurality of tape transmitters of the kind commonly used in printing telegraph operation for entering both operational orders and mathematical information, a plurality of registers in which mathematical information from the tapes or calculated by the calculator may be stored temporarily and a printing device also of the type commonly used in the printing telegraph art for recording various items of information, including the arguments of the problems, partial results and the final solutions.

Figure 1:
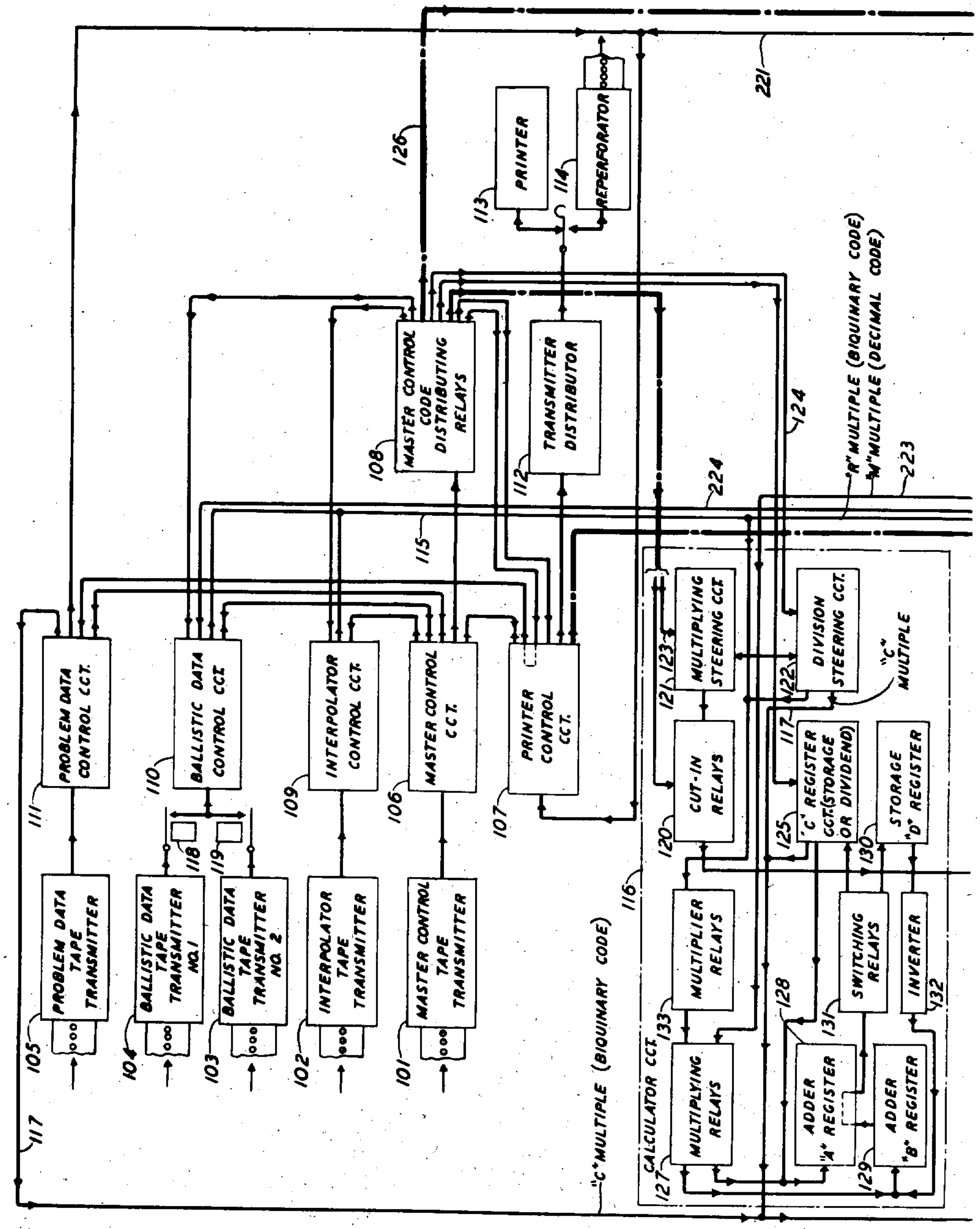

In Fig. 1 there is shown a master control tape transmitter 101 which is used to transmit operational orders from a so-called routine tape into the master control circuit 106 which has general control over all the operations of the device. Other similar transmitters are the interpolator tape transmitter 102, the ballistic data tape transmitters 103 and 104 and the problem data tape transmitter 105, each with its control circuit. All of these transmit mathematical information from appropriate tapes and all of this information is generically problem data. That provided by the problem data tape constitutes the arguments of the problem, that from the interpolator tape constitutes correlated or empirical data and that from the ballistic tapes constitutes table information or precalculated data such as is usually found in the so-called tables of functions such as trigonometric, logarithmic, ballistic and other such data. In the operation of this device the routine tape is operated cyclically, that is, it runs through its transmitter over one complete set of routine orders necessary for the calculation of a function from one given argument or set of arguments. The problem data tape usually contains a series of arguments and is moved forwardly step-by-step under control of the master control circuit, the master tape operating through one cycle for each argument. The remaining tapes contain necessary information and may be moved from point to point either forwardly or backwardly to transmit information called for by the master control from time to time during the calculating operations.

Figure 2:
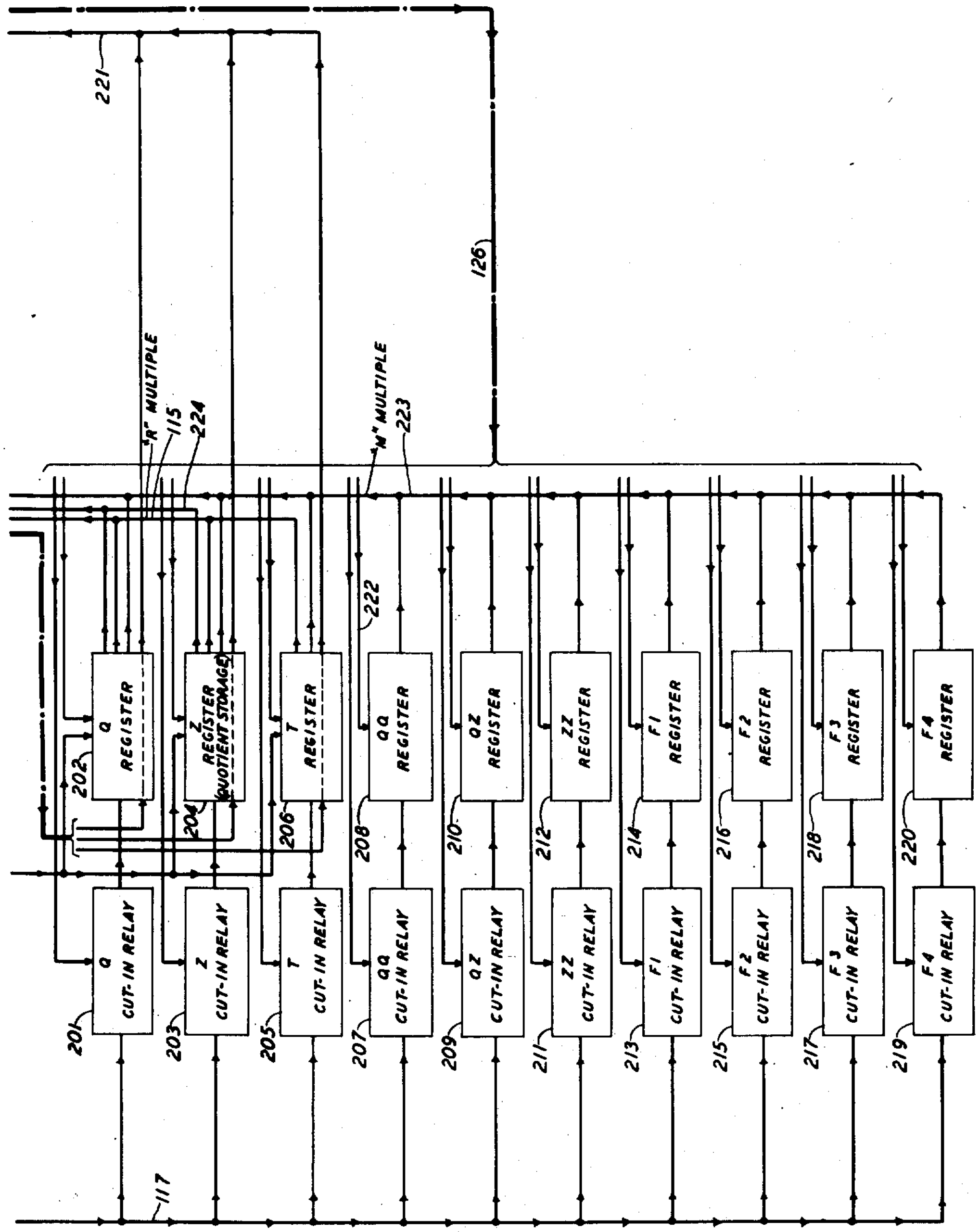

The calculator here generally shown as included in the broken line rectangle 116, consists primarily of four relay registers, the A register 128 constituting an augend element, the B register 129 constituting an addend element and the C register 125 and D register 130 being used alternatively as sum elements. All problems presented to the calculator are in the form of problems in multiplication and the calculation is actually performed by summing the values registered at various times in the A and B registers. For this purpose a set of multiplying relays 127 and a set of multiplier relays 133 are provided, by means of which a multiplicand operating the multiplying relays 127 may be multiplied by one digit at a time of the multiplier which operates the multiplier relays 133. There is provided a set of switching relays 131 for determining into which register, the C register 125 or the D register 130 the values in the A and B registers shall be summed. Values stored in the D register 130 may be transferred only to the B register 129, by way of an inverter 132. This is a means by which the value being transferred from the D register to the B register may be transferred as it is or in its complemental form. Values stored in the C register 125 may be transferred either to the A register or transmitted out over the C multiple 117 for transfer to any one of the various registers shown in Fig. 2.

The calculator 116 is under general control of a steering circuit 121 which controls the various steps in a multiplying calculation cycle. When a problem in division is presented an additional circuit, the division steering circuit 122 is brought into action to make the necessary changes and alterations in the calculating cycle. The cut-in relays 120 ordered into operation by the master control circuit 106 through the code distributing relays 108 operate to activate one decimal denominational order at a time of certain registers which then transmit over the R multiple 115 to operate the multiplier relays under control of the steering circuit 121. The division steering circuit, ordered into operation over the path 124, besides modifying the calculation cycle provides a supply of multiplier digits over the R multiple 115 to the multiplier relays 133 as trial quotient digits and transmits the correctly calculated quotient digits over the C multiple 117.

The steering circuit essentially constitutes the means for controlling the pattern of operations throughout the calculation cycle. Since in problems in multiplication this cycle is straightforward the steering circuit comprises a string of relays which operate in sequence starting from any given selected point and ending at any given selected point, there being in this embodiment three relays for each cycle and as many groups of three as there will be cycles or shifts in columnar arrangement. In a problem in division it is not possible to select the true quotient digit without trial and hence if a certain digit is tried and found to be unsatisfactory the orderly sequence in the operation of the steering relays must be interrupted and the chain recycled, that is after such an unsatisfactory trial the steering chain must be reentered and another trial made. Hence the division steering circuit 122 is shown as a separate entity but one which operates in conjunction with the multiplying circuit 121. Actually it operates in addition to the principal circuit 121.

Figure 3:
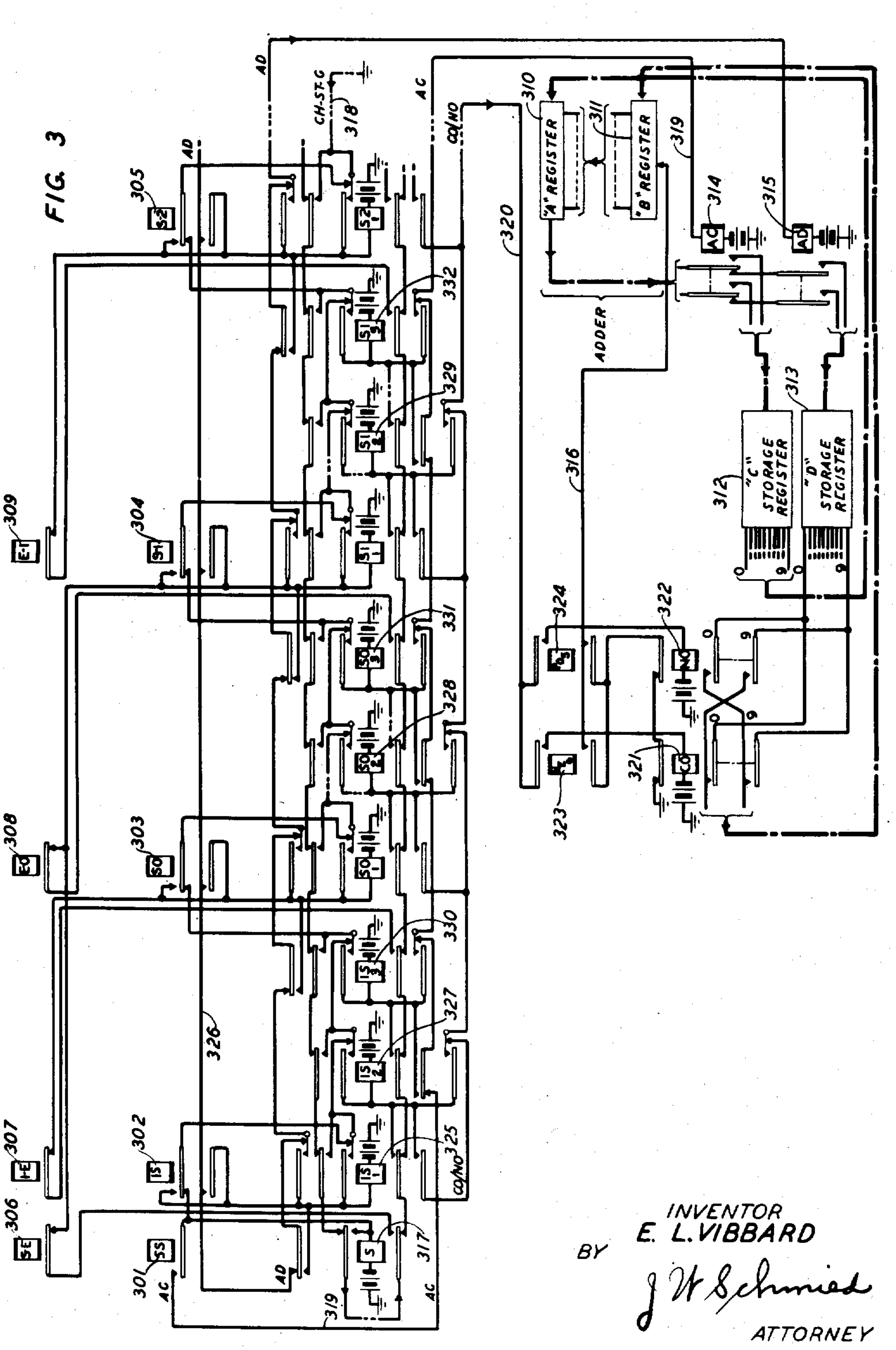
Fig. 3 is a schematic circuit diagram showing certain details of the steering circuit and illustrating how this steering circuit determines which of the two storage registers shall be used as the depository of a sum of the quantities expressed in the addend and augend registers.

Fig. 3 is a schematic circuit diagram having some of the attributes of a flow chart intended to illustrate the transfer of values between the different registers of the common adder. The so-called start function relays and the end function relays as well as a number of the steering chain relays are shown. The start function and end function relays are selectively operated under orders from the master control circuit and thus determine at what point the action of the steering chain shall start and at what point it shall terminate. The four registers of the common adder are each indicated by a rectangle appropriately labeled.

Relays 301 to 305 are the start function relays and relays 306 to 309 are the end function relays. Every calculation requires that one of each set be energized to define the limits of the operation as fully explained in the Andrews-Vibbard application. Now it will be remembered that the values held in the A (augend) register 310 and the B (addend) register 311 may be summed into either the C register 312 or the D register 313. For this purpose a group of relays here represented by the AC relay 314 and the AD relay 315 is employed. When the AC relays are operated, the sum of the values in the A register 310 and the B register 311 is registered in the C register 312 and when the AD relays are operated the sum is registered in the D register 313. This arrangement is clearly indicated by the circuits through the armatures and contacts of the AC and AD relays.

Summing is accomplished by grounding the carry-in lead 316 (and supplying certain local grounds to the summing circuits) whereby the combination circuits set up through the B register 311 and the A register 310 are effective to register a sum in either the C or D register.

All operations of the adder are controlled by the steering chain which as pointed out is generally controlled by the start and end function relays. Thus if the S—S start function relay 301 has been operated by the master control circuit, the relay 317 will be the first in the steering chain to operate and the chain start ground lead 318 will be extended through the armature and contact of relay 301 to the AC lead 319 to operate the AC relays 314. The A and B registers being set by the multiplying and multiplier relays and the CO/NO lead 320 being open at this time (since no number 1 chain relay is up) so that neither the complement relay 321 nor the normal relay 322 may be operated through the contacts of either the NEG relay 323 or the POS relay 324, whichever is operated, the carry lead 316 may be grounded. Hence the sum of the values in the A and B registers is registered in the C register 312.

If, on the other hand, the 1–S start function relay 302 has been operated by the master control circuit, then the 1S–1 steering chain relay 325 will be the first to operate and the AD lead 326 will be grounded instead of the AC lead 319. Hence the AD relay 315 instead of the AC relay 314 will be operated and the sum will be registered in the D register.

Now it will be explained in more detail hereinafter how, after the D register has been filled, the next step consists in transferring the value in the C register to the A register and that in the D register to the B register. Hence on the operation controlled by any one of the number 2 relays, such as the 1S–2 relay 327, the S0–2 relay 328 or the S1–2 relay 329, the CO/NO lead 320 is grounded thus operating either the NO relay 322 to transfer the registration in the D register 313 in normal manner to the B register 311 or operating the CO relay 321 to invert the value being transferred from the D register to the B register. During this operation neither the AC nor AD relays are operated and since either the CO or the NO relay is operated, the carry-in lead is opened.

However, as soon as one of the number 3 relays such as 1S–3 relay 330, S0–3 relay 331 or S1–3 relay 332 is operated, then the AC lead 319 will be closed so that the sum of the values transferred from the C and D registers will be calculated and registered in the C register. The CO/NO lead 320 is opened during the operation of the number 3 relay alone so that the carry-in lead 316 may be closed.

These operations may be followed more closely through the following description of the details of the calculating cycle.

Figure 4:
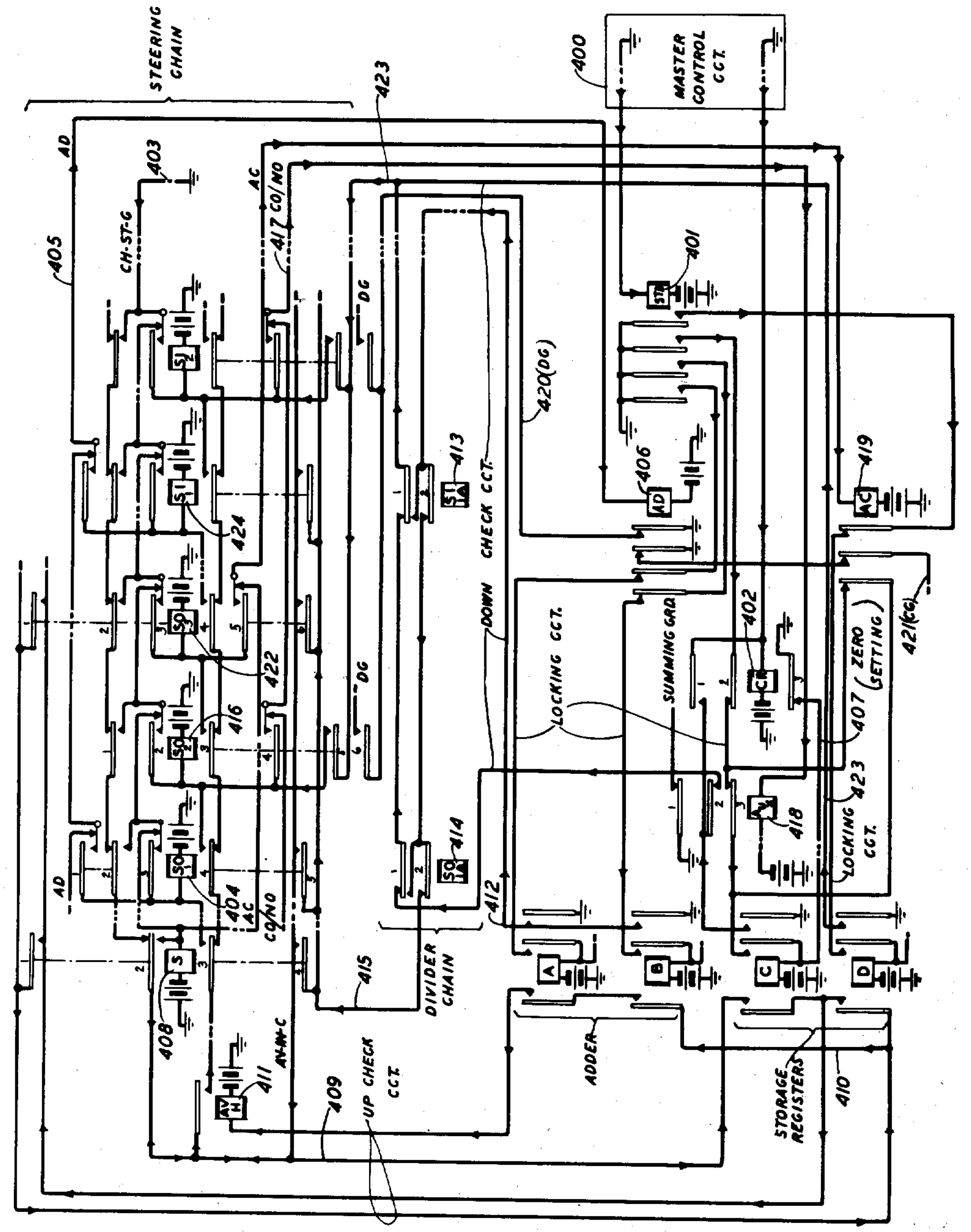
Fig. 4 is a schematic circuit diagram showing the essential elements used for carrying out the calculating cycle, which diagram may be used in conjunction with Fig. 15 to explain in detail the steps in a calculating cycle.

Fig. 4 is a schematic circuit diagram useful in explaining the calculating cycle. As explained hereinbefore, every problem is entered in the calculator as a problem in multiplication and solved by an operation in addition. The calculating cycle, after the proper conditions have been set up by the master control circuit, consists in the interaction of circuits controlled by the common adder and by the steering chain. These are three fundamental circuits associated with the common adder known as the locking circuit, the down-check circuit and the up-check circuit. The locking circuit is one divided into four branches one for each of the four registers A, B, C and D. A locking circuit is one which after a relay of a register has been operated will maintain such relay in constant operation until such time as the register is to be released. A down-check circuit is one which will give a signal when and only when every relay without exception is down, that is, released to its normal unoperated position. An up-check circuit is one which will give a signal when and only when one relay in each binary group and one relay in each quinary group of each decimal denominational order of a register is up, that is, in its operated position. The down-check circuit in the registers of the common adder is a multiple circuit having a branch to each relay of a register while the up-check circuit is a series arrangement closed only when the conditions above-stated have been realized. In this figure, the A, B, C and D registers are each indicated by a single relay, the up-check circuit being controlled by the left-hand armatures thereof, the locking circuit by the inner right-hand armatures thereof and the down-check circuits by the outer right-hand armatures thereof.

Figure 15:
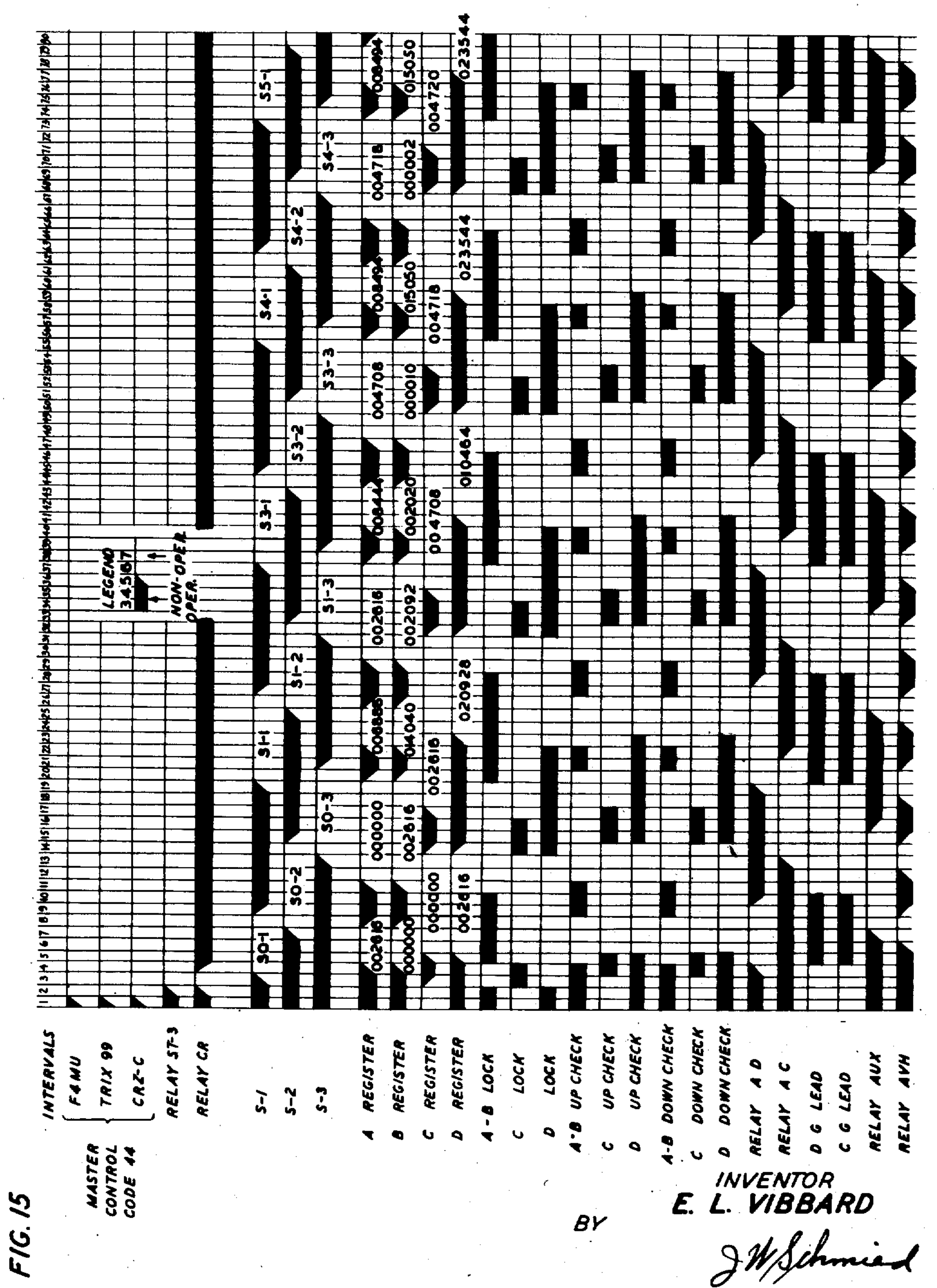
Fig. 15 is a sequence chart showing the order in which the various steps of the calculating cycle are performed and is placed on a time basis even though each operation is in consequence of a previous operation and no time elements other than the time which it takes a relay to operate are involved.

For the benefit of those who find it helpful to picture the operation of a circuit through a sequence chart, Fig. 15 has been prepared. In this figure the indication of the operation is as shown in the legend, the relay being operated during the portion shown blank and the relay being released to its normal unoperated position during the portion shown in solid black. The slanting change from one condition to another indicates the time it takes for the armatures of the relay to move from one position to another and this time is indicated in this chart as uniform though it must be remembered that such time varies in actual practice depending on many known factors. Moreover, it is assumed herein that the circuits opened or closed by either the operation or the release of a relay do not become thus effectively opened or closed until the end of this small time period, though again it must be remembered that these operations vary somewhat in actual practice. Where circuits are indicated, the closure and opening thereof is indicated as instantaneous and at the end of the operation or release of the relay affecting such closure or opening. However, there are no critical relations in this circuit and every operation is a dependent one, as differentiated from a timed operation. That is, each circuit operation depends on the definite closure or opening of some other circuit rather than the passage of some given time interval after some other operation or some time interval running simultaneously with some other time interval. Time flows from left to right. Numbers in the blank spaces indicating the operation of the relays indicate the progress of the calculation.

For the purpose of this description let it be assumed that the master control circuit has been operated to direct a calculation in which an operation 56 used for setting the steering circuit (master code O6) by grounding the leads S–0, E–5 and POS is followed by an operation 57 used for ordering a calcuation (master code 44) by grounding the leads F4MU, TR1X99 and CRZ–C. The steering chain control relays S–0 and E–5 are operated so that when the chain start ground circuit is closed the S0–1 relay will be the first relay in the steering circuit to be operated. As soon as the S–0, E–5 and POS relays are operated the master control circuit will be advanced and the operation 57 will be ordered. This will have the effect of releasing the C register, filling it automatically with zeros and starting the multiplication of .02616 by 1.80499 to derive the product .04721 (by way of example). The value .02616 is the multiplicand and is taken from an example set forth in detail in the said Andrews-Vibbard application. The value 1.80499 is the multiplier, produced automatically from the value .195 through the code TR1X99 by automatically supplying 1 as a first digit, then the nine's complement of 195 followed by two nines automatically supplied to practically make up for the fugitive one not here provided for.

Figure 5:
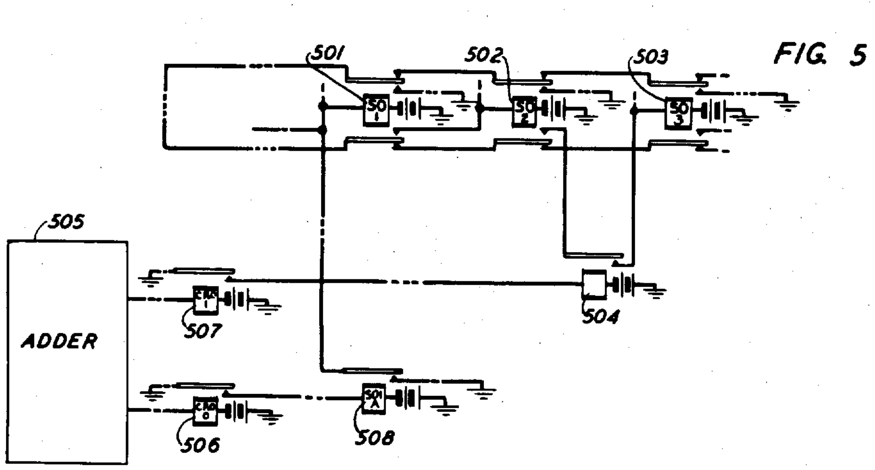
Fig. 5 is a schematic circuit diagram showing the fundamental conception of the means for producing a recycle operation in the steering chain in a problem in division.

At the beginning of the operation it is assumed that the master code 44 transmitted has become effective so that during interval 1 of the sequence chart, Fig. 5, the relays responsive to the codes F4MU, TR1X99 and CRZ–C operate. At this time the A, B and D registers are normal and every relay in each of these registers is released. The C register may or may not be operated and locked in from some previous operation. If it is operated, the code CRZ–C is designed to release it and then automatically fill it with zeros. In this chart it is assumed that this C register is operated and contains some registration, and is locked over some other path than that shown herein but which may be controlled by the operation of a relay CR responsive to the CRZ–C code. No one of the relays in the steering chain has operated. The A, B and D locking circuits are open, the A, B, and D up-check circuits are open, the A, B and D down-check circuits are open, the AD, AC and AUX relays are released and the DC and CG leads for supplying grounds to the D and C registers for transferring their registrations to other points are closed. Therefore, the interval 1 is used by the code responsive relays in operating.

At the end of this interval, the master control circuit 400, closes circuits for the operation of the ST–3 start relay 401 and the CR relay 402 and interval 2 is shown as being used by these relays in operating. At the end of interval 2 in response to the operation of the start relay 401, the A and B locking circuits are closed and become effective so that as soon thereafter as any relay in the A or B registers becomes operated it will lock. Relay 401 also closes the locking circuit for the D register and closes one point in the locking circuit of the C register which will become controlling during the following operations in place of another branch which may have been closed up to this time. However, during this interval 2, the CR relay 402 has operated so that at the end of this interval the C register is unlocked and its relays may release.

Through a circuit explained in detail in the said Andrews-Vibbard application, a relay (not shown) associated with the CR relay and responding to the code CRZ–C will close the chain start ground indicated here as conductor 403 which as hereinbefore mentioned will cause the operation of the S0–1 steering chain relay 404. Therefore it will be seen that interval 3 is used for the operation of S0–1 and the release of the relays of the C register. At the end of this interval, a circuit hereinbefore described for the operation of the multiplying and multiplier relays will have been closed by the operation of the S0–1 relay 404 and therefore the A and B registers will be set during the following interval 4. Also, during interval 4 as a result of the operation of relay 404 a circuit will be established from the chain start ground thence in series through the armatures and contacts of the steering chain relays from the end to that one which is now operated, the front contact and armature 3 of relay 404, armature 1 and front contact of this same relay, the AD lead 405 to the AD relay 406, causing this relay to operate during the ensuing interval 4. At the end of this interval and due to the operation of the AD relay 406, the A and B lock circuits and the DG and CG circuits will be opened and as a result of the setting of the A and B registers the A and B up-check circuits will be closed, the A and B down-check circuits will be closed and the D register will become operative to sum the quantities now registered in the A and B registers. It may be noted that the registrations in the A and B registers are not locked in at this time but depend only on the circuits through the multiplying and multiplier relays so that as soon as the next relay in the steering chain becomes operated to release the multiplier relays, the A and B registers will release.

During interval 5, therefore, the D register is being set to the sum of the quantities registered in the A and B registers and consequently at the end of this interval the D up-check circuit and the D down-check circuit will be closed.

Now at the end of the interval 2 the CR relay 402 opens the locking circuit of the C register and during interval 3 the C register releases. At the end of this interval 3 the C down-check circuit opens the locking circuit of the CR relay 402 so that during interval 4 relay CR releases and at the end of interval 4 closes the locking circuit of the C register as well as the zero setting lead 407 indicated as grounded at the back contact and armature 3 of relay 402. Thus during interval 5 simultaneously with the summing of the registrations in the A and B registers into the D register, the C register is being automatically set to zero.

At the end of interval 6, therefore, the C up-check circuit will also be closed and since all four up-check circuits are new closed, the chain start circuit ground may be traced through the front contact and armature 2 of S0–1 relay 404, back contact and armature 2 of relay 408, conductor 409, the C up-check circuit, the D up-check circuit, conductor 410, the B up-check circuit, the A up-check circuit to the AVH advance help relay 411 to cause the operation of this relay, during the ensuing interval 6. The ground on conductor 409 from the chain start ground source is connected through the armature and contact of relay 411, armature 3 and back contact of relay 408, armature 4 and front contact of relay 404 to cause the operation of the S0–2 relay 416 (during interval 7). The A and B down-check circuits connect ground to conductor 412 by any and all operated relays in the A and B registers and extend this ground through back contacts of certain divider control relays 413 and 414, conductor 415, armature 5 and front contact of relay 404 to conductor 409 thus placing this circuit in parallel with the chain start ground circuit. Since, as will be seen shortly, the ground from the original source will be cut off by the operation of the S0–2 relay 416, this ground from the A and B down-check circuit may be further traced over conductor 409, armature 2 and back contact of relay 408, armature 2 and front contact of relay 404 and front contact and armature 3 of relay 404 to maintain the S0–1 relay 404 operated after the S0–2 relay has operated and until the A and B registers are fully released. During interval 6 the AVH relay 411, therefore, operates and this closes the ground through the steering relay chain circuit through armature 4 and front contact of S0–1 relay 404 to the winding of the S0–2 relay 416. During interval 7 the S0–2 relay 416 operates.

Turning back now for a moment to Fig. 3 it should be noted that the AD relay is to be operated during the operation of its associated number 1 relay in the chain such as the 1S–1 relay 325, the S0–1 relay, the S1–1 relay or the S2–1 relay. In order to save time the AD lead is closed by an auxiliary contact of the preceding relay to the winding of such associated relay so that when the associated chain relay is energized this AD relay will be energized in parallel therewith. For the sake of simplicity such auxiliary contact on the preceding relay is not shown in Fig. 4 but only the continuity contact on the associated chain relay which insures that the already closed circuit for the switching relay will not be opened during the actual movement of the armatures of the chain relay. Similar circuits are provided for the AC relay and the AUX relay operated over the CO/NO lead 320. During the following description, therefore, it will be understood that the movements of the AD, AC and AUX relays are simultaneous with the movements of their associated chain relays.

During interval 7 the AUX relay 418 operates in parallel with the S0–2 relay 416. Also the S0–2 relay opens the circuit for the multiplier relays (through contacts not shown here) so that during interval 8 the A and B registers release, their locking circuits being open through the operation of the AD relay 406. The consequent breaking of the up-check circuit releases the AVH relay 411.

When, at the end of interval 8 the A and B registers are completely released, the holding circuit for the S0–1 relay 404 is opened, and the A—B up-check and the A—B down-check circuits are opened. The C and D locking circuits are both held closed at this time through the back contacts of the AC relay 419. Therefore, during interval 9 the S0–1 relay 404 and the AVH relay 411 are releasing.

At the end of interval 9 when the S0–1 relay has become completely released the circuit for the AD relay 406 is opened and this relay releases during interval 10. At the end of interval 10 the DG lead 420 and the CG lead 421 are closed to ground and the A—B locking circuits are grounded so as to lock up the registrations which will soon be made in the A and B registers. The DG lead 420 and the CG lead 421 are here only indicated but they function as will be explained in more detail hereinafter to supply the grounds for the transfer of the registrations contained in the D and C registers to the B and A registers, respectively. Therefore, during the ensuing interval 11 the A and B registers will be reset. At the end of interval 11, therefore, the A, B, C and D up-check circuits will be closed, resulting in the energization during interval 12 of the AVH relay 411.

At the end of interval 12, when relay 411 is fully operated, ground is extended over armature 3 and front contact of S0–2 relay 416 to the S0–3 relay 422. The S0–2 relay is locked to the C—D down-check circuits and will not release until both the C and D registers are fully released. The D down-check circuit may be traced over conductor 423 through armature 5 and front contact of S0–2 relay 416 to the winding thereof. The C down-check circuit is closed over armature 2 and front contact of the AUX relay 418, thence through a chain of contacts controlled by the divider control chain relays 414 and 413 where it joins conductor 423.

Now, simultaneously with the operation of the S0–3 relay during the interval 13, the circuit of the AC relay 419 will be closed and this relay will operate. At the end of interval 13, therefore, the CG lead and the C and D locking circuits will be opened.

The C and D registers release during the interval 14 so that at the end of this interval the C and D down-check circuits are both opened to unlock the S0–2 relay 416. Interval 15 is, therefore, marked by the release of relays 416 and 411. With relay 416 down, the AUX relay 418 releases during the ensuing interval 16. The AUX relay is operated over the CO/NO lead 417 which as explained in the description of the previous schematic, Fig. 3, is used to operate either the normal or the complement relays while the value in the D register is being transferred to the B register. Now that the CO/NO lead 417 is freed of a ground connection the circuit, hereinbefore explained, through a contact of either the positive or negative relay is closed to complete the carry-in lead (here merely indicated as the summing lead from the back contact of armature 1 of the AUX relay 418) so that the values in the A and B register are summed into either the C or D register. In the present instance, the AC relay 419 is operated, so the C register will now be set. This operation takes place during the interval 17, starting at the end of interval 16 when the CO or NO relay, released at the same time as AUX, becomes completely released.

Therefore, at the end of interval 17, the A, B and C up-check circuits will be closed so the AVH relay 411 operates during interval 18 to cause the operation of the S1–1 relay 424 during the following interval 19. The up-check circuit effective at this time includes the portions of this chain controlled by the A, B and C registers, that portion heretofore controlled by the D register being at this time shunted by armature 1 and front contact of the S0–3 relay 422.

During this interval, while the S0–3 relay and the S1–1 relay are concurrently operated the A and B registers will be released preparatory to the start of the next calculating cycle which starts with the completion of the release of the S0–3 relay 422. As S1–1 relay 424 operates, the circuit for the AD relay 406 is closed so that this relay operates with relay 424 during interval 19. Therefore, at the end of interval 19 the A and B lock circuits will be opened and the A and B registers will release during the ensuing interval 20. At the end of the interval 20 when the A and B registers are completely released, the holding circuit for the S0–3 relay 422 will be opened by the opening of the A—B down-check circuit whereupon the S0–3 relay 422 releases during interval 21. Therefore, the end of interval 21 marks the complete end of the first calculating cycle and the beginning of the next.

During interval 22 and responsive to the release of the S0–3 relay 422 during the preceding interval the AC relay 419 releases, resulting in the closing of the D locking circuit. The A and B registers are now set through the multiplying relays, the A register to represent the unit digits of the products of the multiplicand digits by the second multiplier digit and the B register to represent the tens digits of these products. At the end of this interval 22 the A and B up-check circuits will be closed and the A and B down-check circuit will also be closed. Since the A and B registers are fully operated the D register will be set to the sum thereof during interval 23 so that the end of this interval will find the D check circuits closed and therefore the circuit for the AVH relay closed. It will now be noted that the state of the circuits reached at the end of interval 23 is exactly like that reached at the end of interval 5.

Interval 21 is therefore a repetition of interval 6. Likewise intervals 42, 60 and 78 will be like interval 6, and the pattern including intervals 6 to 23, inclusive, is followed repeatedly until the end of the calculation. The next cycle will not be described in detail since it is a repetition of that just described. The sequence chart of Fig. 15 is continued, however, so that the pattern of calculation may be followed through several cycles to show how the accumulating subtotals in the C register build up the product 004721. The relays of the steering chain are marked S–1, S–2 and S–3 and the particular group is marked within the chart. It should be particularly noted that since the third multiplier digit is zero that the S2– group is skipped and that the S3–1 relay follows the S1–3 relay. In actual practice the S2–1 relay operates but that causes the immediate operation of the S3–1 relay and the release of the S2–1 relay. The extremely slight disturbance that this operation causes in the chain of events is not pictured here since the primary effort is to show the calculating cycle.

It will thus be seen that each time the up-check circuit is completed the next steering chain relay will be operated whereupon it and the one previously operated will remain concurrently operated until either the A and B registers or the C and D registers become completely released to open the corresponding down-check circuits, whereupon the steering chain relay previously operated is released. Thus each step in the calculating cycle is checked and the operations will advance only when the predetermined conditions are reached.

The calculating cycle may be restated simply as a series of steps each one of which depends on the completion of the previous one. The cycle is divided into six steps controlled by the three steering chain relays for each shifting group of such relays. These steps take place in the following order, and during the time in which:

1. The number 1 relay above is operated.
2. The number 1 and number 2 relays are concurrently operated.
3. The number 2 relay alone is operated.

4. The number 2 and number 3 relays are concurrently operated.
5. The number 3 relay alone is operated.
6. The number 3 relay and the number 1 relay of the succeeding group are concurrently operated.

The operations which occur during each of these steps are as follows:

1. The A (augend) and B (addend) registers are set from the multiplying and multiplier relays and the sum is registered in the D register or the C register. If the sum is first registered in the D register and the C register does not already hold a registration, it is automatically set to zero. The end of this operation is signaled by the completion of the up-check circuit consisting of a series connection through the contacts of one binary and one quinary relay in each decimal denominational order in each of the four (A, B, C and D) registers. This signal causes the operation of the number 2 relay of the chain and therefore starts the second step.

2. The A and B registers are now released. The operation of the number 2 relay opens the energizing circuit for the multiplier relays and since the A and B locking circuits are held open by the number 1 relay, these registers release. The end of this operation is signaled by the complete removal of ground from the A and B down-check circuits. Since the number 1 relay is held locked to this down-check circuit, it remains operated until the removal of ground therefrom proves that the A and B registers have been completely released. The consequent release of the number 1 relay starts the third step.

3. The registration in the C register is now transferred to the A register by the CG ground and the registration in the D register is simultaneously transferred to the B register by the DG ground. The end of this operation is signaled by the completion of the up-check circuit through all four registers. In this case the registrations placed in the A and B registers are locked in because they must be held while the C and D registers are being released. The completion of the up-check circuit causes the operation of the number 3 relay and starts the fourth step.

4. The C and D registers are released. Upon the operation of the number 3 relay the locking circuit for the C and D registers is opened and these registers therefore release. The end of this operation is signaled by the complete removal of ground from the C and D down-check circuits. Since the number 2 relay is held locked to this down-check circuit, it remains operated until the removal of ground therefrom proves that the C and D registers have been completely released. The consequent release of the number 2 relay starts the fifth step.

5. The values registered in the A and B registers are now summed into the C register. The release of the number 2 relay opens the CO/NO lead and allows the main carry-in lead to be closed whereby the summation of the values in the augend and addend registers is established in the C register. The end of this operation is signaled by the completion of the up-check circuit through the A, B and C registers. The operation of the number 3 relay during this interval shunts that portion of the up-check circuit controlled by the D register. The completion of the up-check circuit causes the operation of the number 1 relay of the next group and starts the sixth step.

6. The A and B registers are released. The operation of the number 1 relay of the next group opens the locking circuit of the A and B registers and they consequently release. The end of this operation is signaled by the complete removal of ground from the A and B down-check circuits. Since the number 3 relay is held locked to these down-check circuits, it remains operated until the removal of ground therefrom proves that the A and B registers have been completely released. The consequent release of the number 3 relay starts the first step of the next calculating cycle.

To summarize, for quick reference to the steps of the calculating cycle, the complete operation may be stated as follows:

| Step | Steering relays in operation | Operation of calculator registers |
|---|---|---|
| 1 | 1 | A and B set from multiplying relays and summed into D. |
| 2 | 1 and 2 | A and B released. |
| 3 | 2 | A set from C, B set from D. |
| 4 | 2 and 3 | C and D released. |
| 5 | 3 | C set to sum of A and B. |
| 6 | 3 and 1 | A and B released. |

*Internal recycle of steering chain*

When the device is set to perform a problem in division the operations of the various relays in the calculator through a calculating cycle are essentially the same as just described except that there is at least one internal recycle in each calculation of a quotient digit. A recycle operation, very simply stated, is an operation in which the number 1 relay of the same group is operated after the number 2 relay rather than the number 3 relay. This simplification is shown schematically in Fig. 5, where the S0–1 relay 501, the S0–2 relay 502 and the S0–3 relay 503 of the steering chain are shown. The normal connection between the front contact and lower armature of relay 502 and the winding of relay 503 is now controlled by a relay 504. The adder 505 will, during that step in the calculating cycle when the relay 502 alone is operated, ground either the carry-out 0 lead or the carry-out 1 lead and thus operate the carry-out 0 relay 506 or the carry-out 1 relay 507. Now as has been set forth in detail in said Andrews-Vibbard application, an outgoing carry 0 denotes a negative remainder and that an outgoing carry 1 denotes a positive remainder. After the binary relays of the quotient digit register have been set then the multipliers 9, 8, 7, 6 and 5 or 4, 3, 2, 1 and 0 are tried. As the result of each trial, either the carry 0 lead or the carry 1 lead is grounded. The grounding of the carry 0 lead denotes an unsatisfactory trial and hence the progress in the orderly succession in the operation of the steering chain relays must be interrupted and another trial quotient digit must be used, this operation being repeated until a satisfactory digit is found. This will result in the grounding of the carry-out 1 lead whereupon the normal action of the steering chain is resumed. Hence from Fig. 5 it will be seen that when relay 502 alone is operated and the adder 505 calculates the sum of the numbers in its A and B registers, either the relay 506 or the relay 507 will become operated. If the result of the trial is unsatisfactory, then relay 506 will be operated and through relay 508 will operate the S0–1 relay 501. If the result of the trial is satisfactory, then relay 507 will be operated and through relay 504 will close the path for the S0–3 relay 503.

Figure 6:
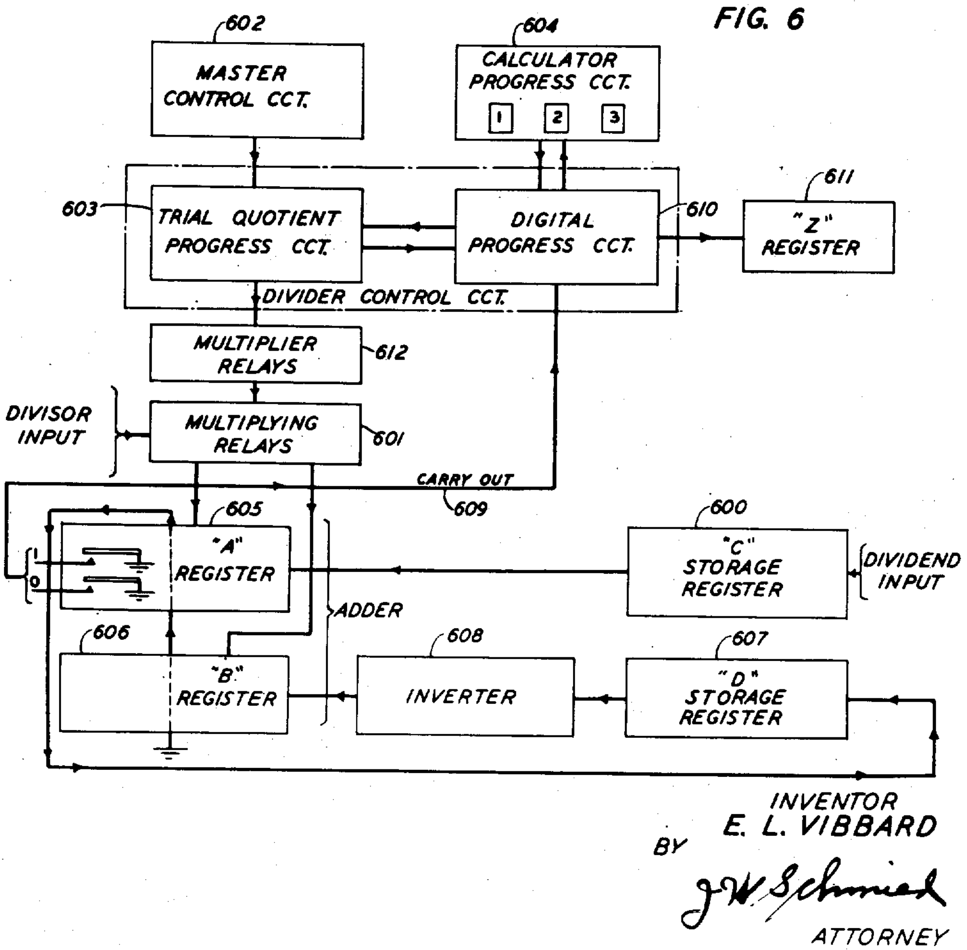
Fig. 6 is a schematic circuit diagram used to explain the general operations in the calculation of a quotient digit.

Fig. 6 is a schematic showing the fundamental operations in division. The dividend is registered in the C register 600 and left there undisturbed until the first quotient digit has been fully determined. The divisor is set to operate the multiplying relays 601 different trial quotient digits from the trial quotient progress circuit 603 being used to operate the multiplier relays until a satisfactory digit has been determined. Thereupon the remainder produced by the subtraction of the divisor by the quotient digit from the dividend is registered in the C register 600, and becomes the dividend for the next trial.

When the master control 602 sets the device for division, the dividend and the divisor are placed as above and the trial quotient progress circuit 603 sets up 5 as the first trial quotient digit. In the manner hereinbefore explained, the relays of the calculator progress circuit or steering chain 604 control the various steps of the calculating cycle. In the third step of the calculating cycle when the number 2 relay alone is operated and when the A register 605 is being set from the C register 600 and the B register 606 is being set from the D register 607 through the inverter 608, a relay known as the "two up one down" relay will render either the carry-out 0 or the carry-out 1 lead effective. This is indicated in Fig. 6 by the contacts within the A register 605 rendering one or the other circuits through the carry-out path 609 effective. In Fig. 6 this path is shown as leading to the digital progress circuit 610. Thus, on the first trial of the digit 5 as a quotient digit, the steering chain is recycled by having the number 1 relay operate in the fourth step instead of the number 3 relay. At this particular time the grounding of the carry-out 0 or carry-out 1 lead over path 609 operates an over five or an under five relay in the digital progress circuit 610 and also operates either the 5 or the 00 relay in the Z register 611 in the decimal denominational order therein corresponding to the particular group of three relays in the steering chain now under operation.

There are thus two slightly different calculating cycles in division, the first in which the steering chain is recycled regardless of the value of the carry-out in step three and the second in which the steering chain is advanced or recycled in direct response to the value of the carry-out as explained by the schematic, Fig. 5.

On the second or any subsequent trial when the carry-out 1 lead is grounded the quinary relay in the Z register 611 is operated and the steering chain advances to the next group of three steering chain relays to calculate the quotient digit for the next decimal denominational order.

The calculating cycle in division may therefore be stated as one having at least ten steps and may be summarized as follows:

| Step | Steering relays in operation | Operations of calculator registers |
|---|---|---|
| 1 | 1 | A and B set from multiplying relays using 5 as multiplier digit and summed into D. |
| 2 | 1 and 2 | A and B released. |
| 3 | 2 | A set from C, B set from D (inverted). Carry-out noted. |
| 4 | 2 and 1 | A and B released. |
| 5 | 1 | A and B set from multiplying relays using either 9 or 4 as multiplier digit and summed into D. |
| 6 | 1 and 2 | A and B released. |
| 7 | 2 | A set from C, B set from D (inverted). Carry-out noted. |
| 8 | 2 and 3 | A and B locked and C and D released. |
| 9 | 3 | C set to sum of A and B. |
| 10 | 3 and (next) 1 | A and B released. |

The above is the shortest division calculating cycle. If the multiplier digit 9 or 4 produces a carry-out 0 at step 7, then the operations of steps 4, 5, 6 and 7 are repeated, this time using either 8 or 3 as the multiplier digit. Thus a division cycle may have as few as ten steps or as many as twenty-six steps (when the quotient digit proves to be either 5 or 0).

Figure 7:
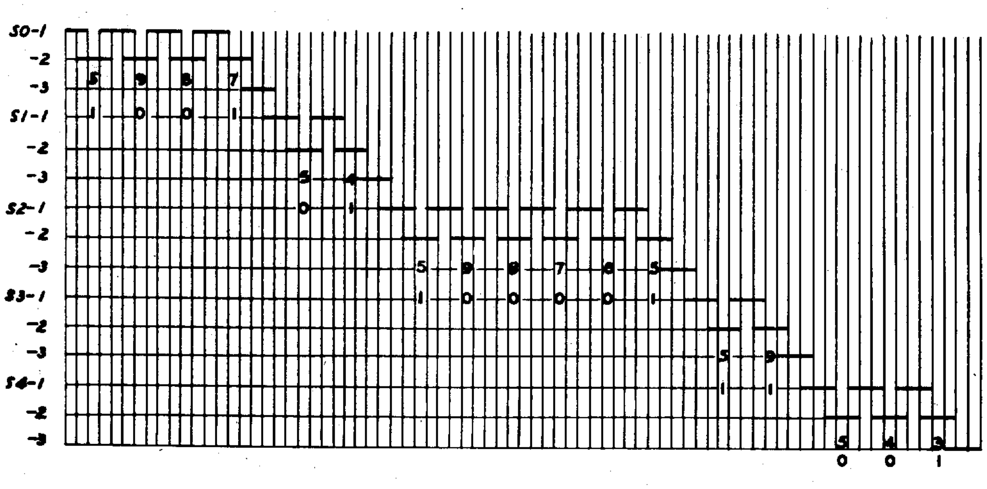
Fig. 7 is a sequence chart showing the advance of the steering chain relays during the calculation of a quotient of 74,593.
Figure 8:
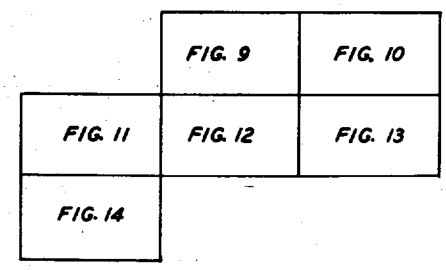
Figure 9:
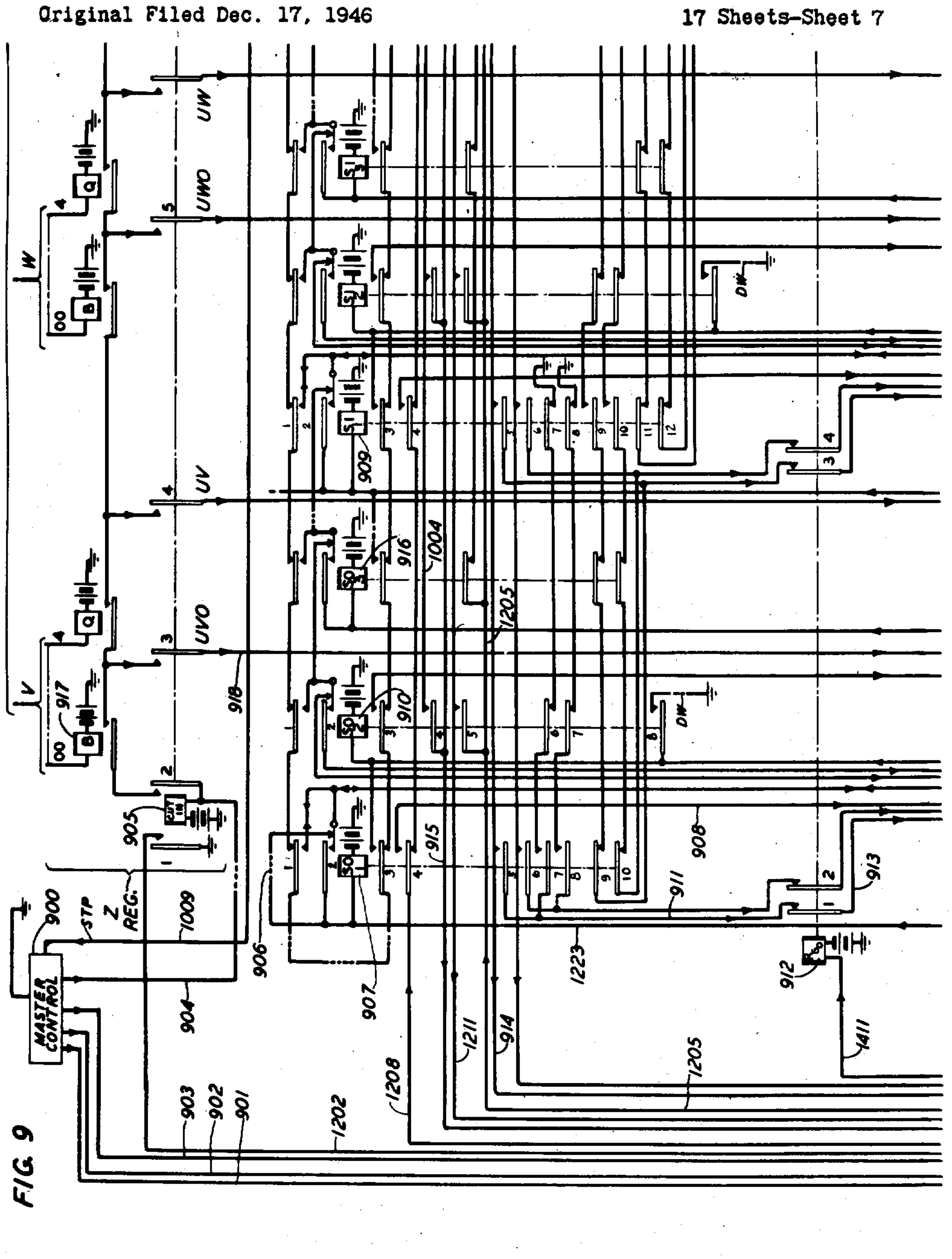
Figs. 9 and 10 show certain circuit details of the steering chain used in every calculating operation and has in addition a schematic representation of the master control circuit from which an operation in division is ordered, together with a schematic circuit representation of the Z register in which the quotient digts are registered as they are calculated.
Figure 10:
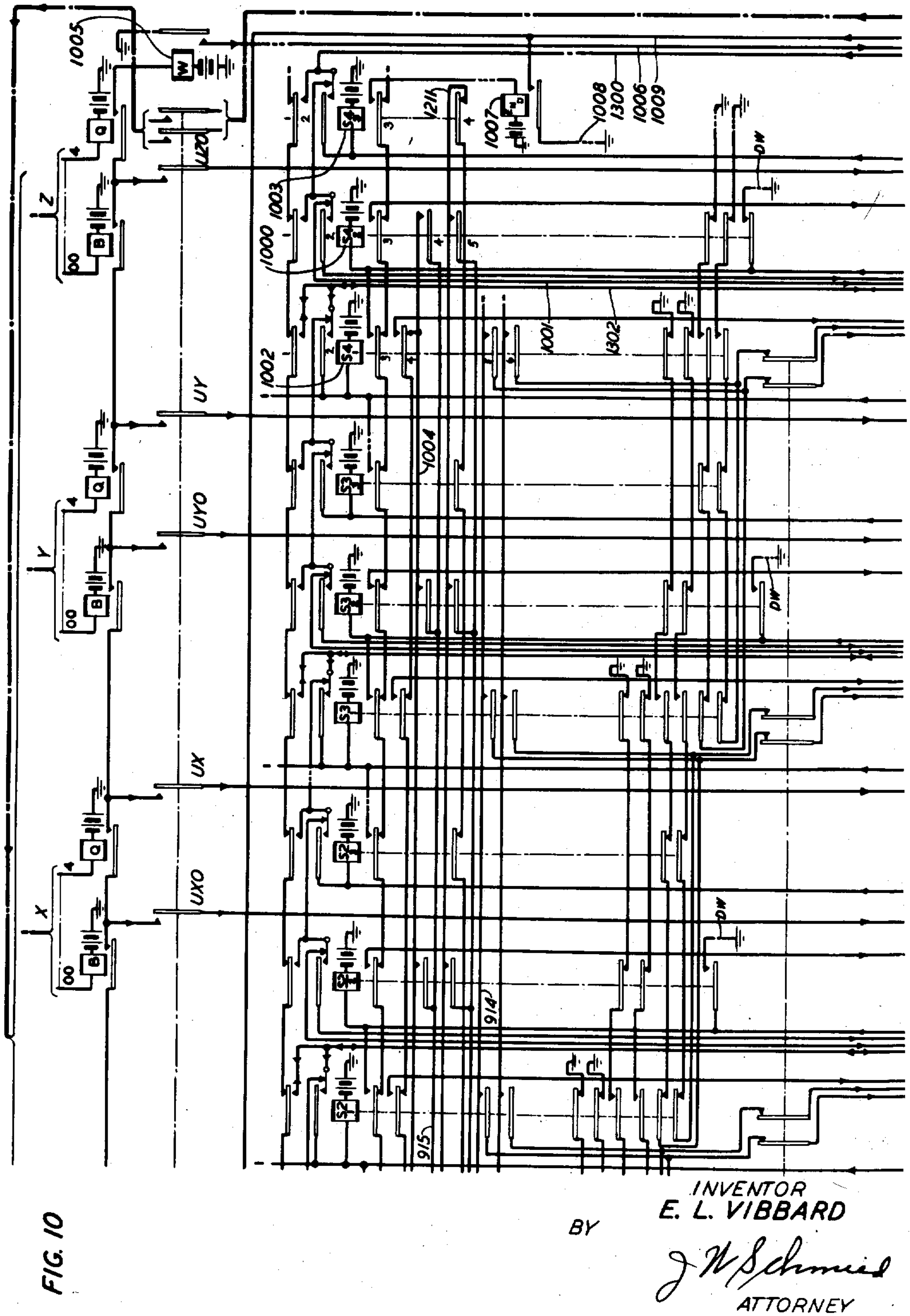
Figure 11:
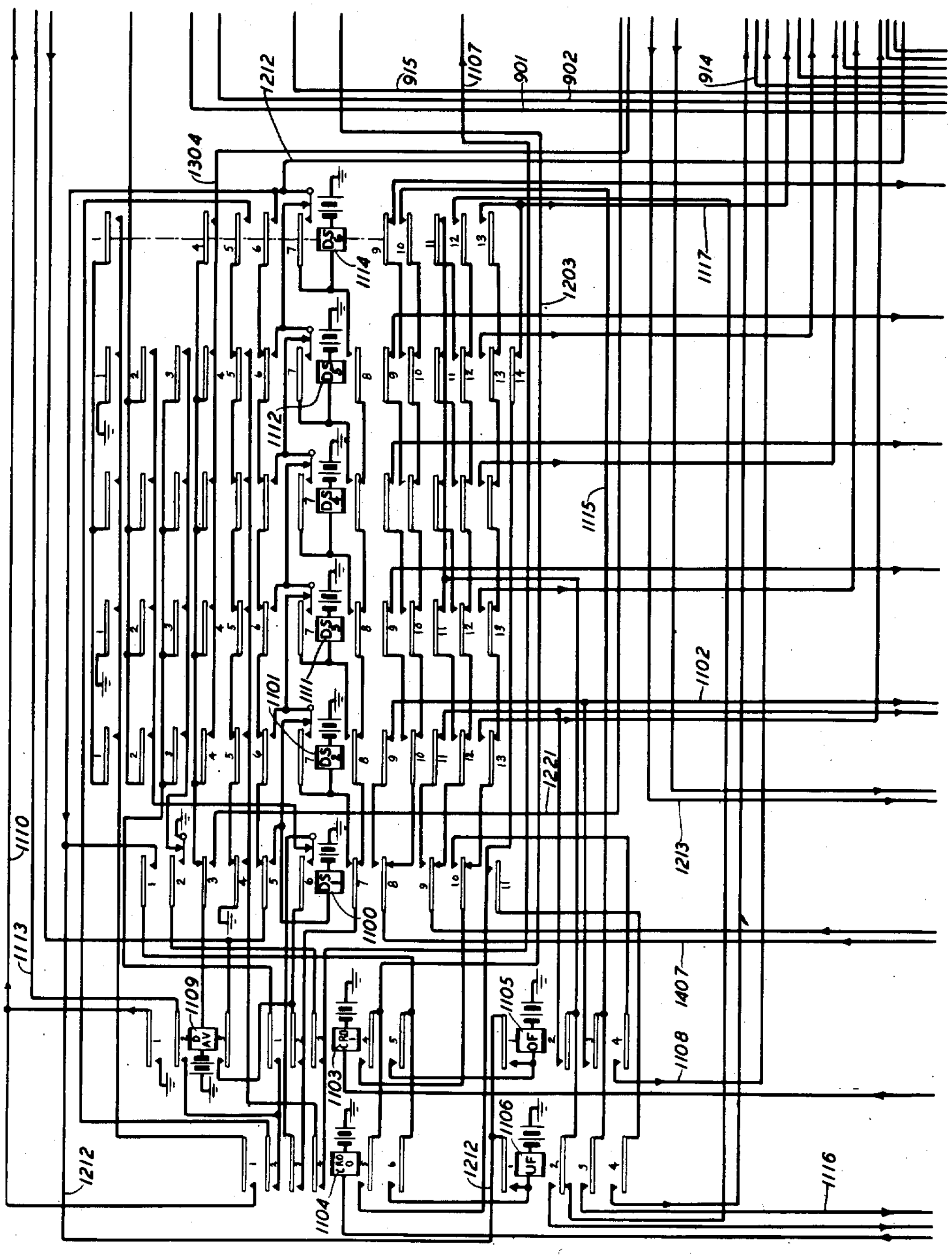
Fig. 11 is a circuit diagram of the division steering circuit which controls the application of the various trial quotient digits.
Figure 12:
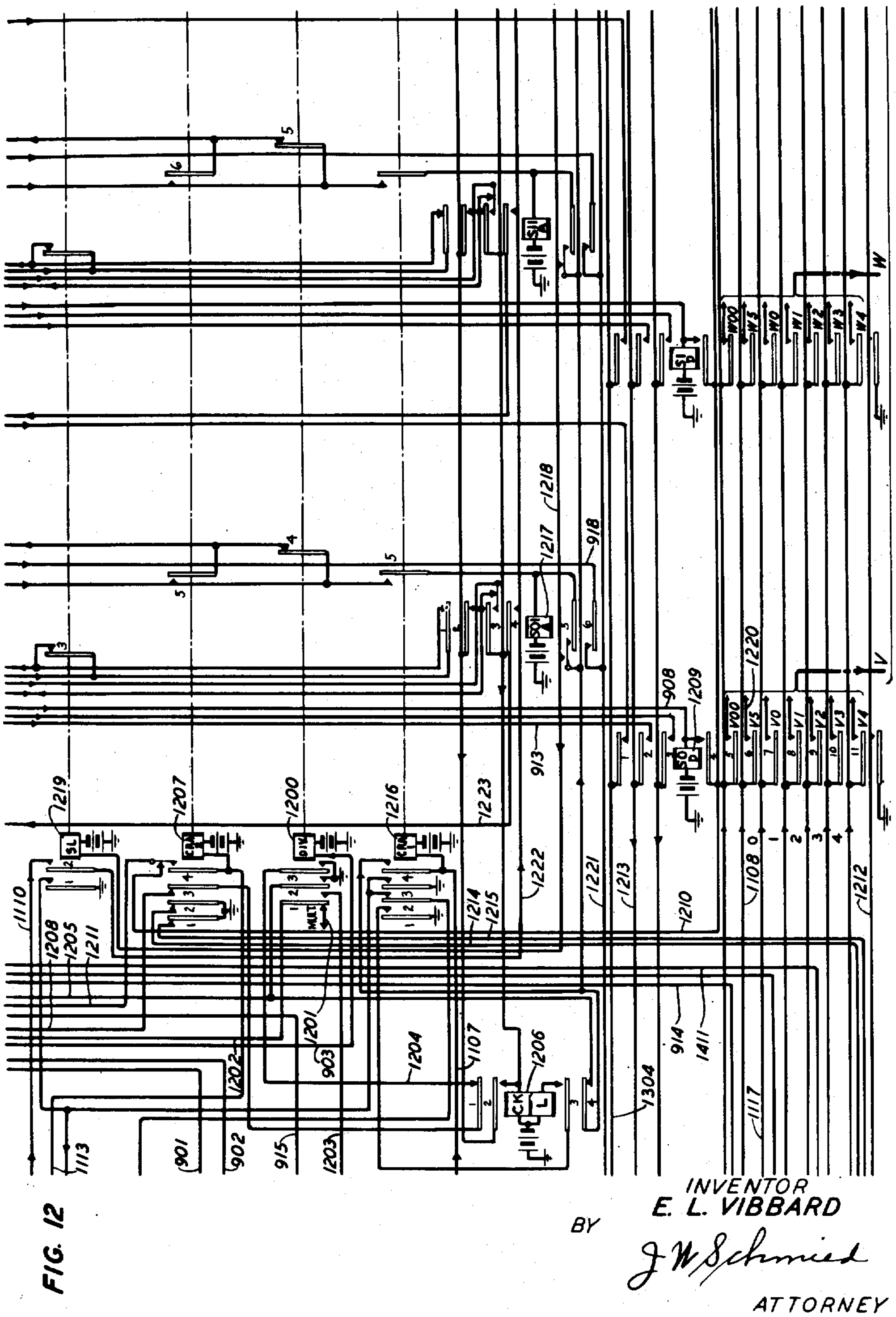
Figs. 12 and 13 show certain circuit details of the division auxiliary steering chain relay circuits.
Figure 13:
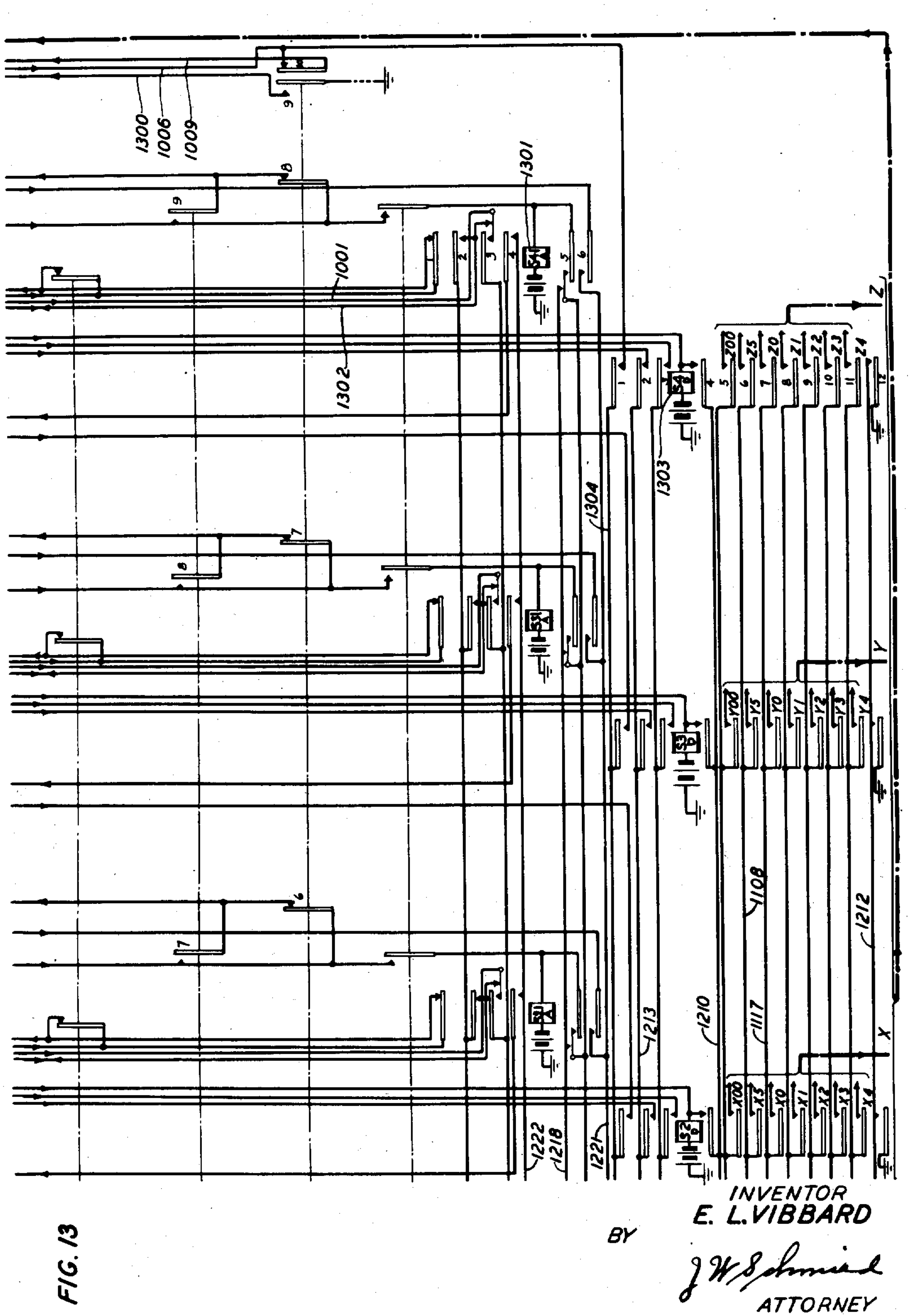
Figure 14:
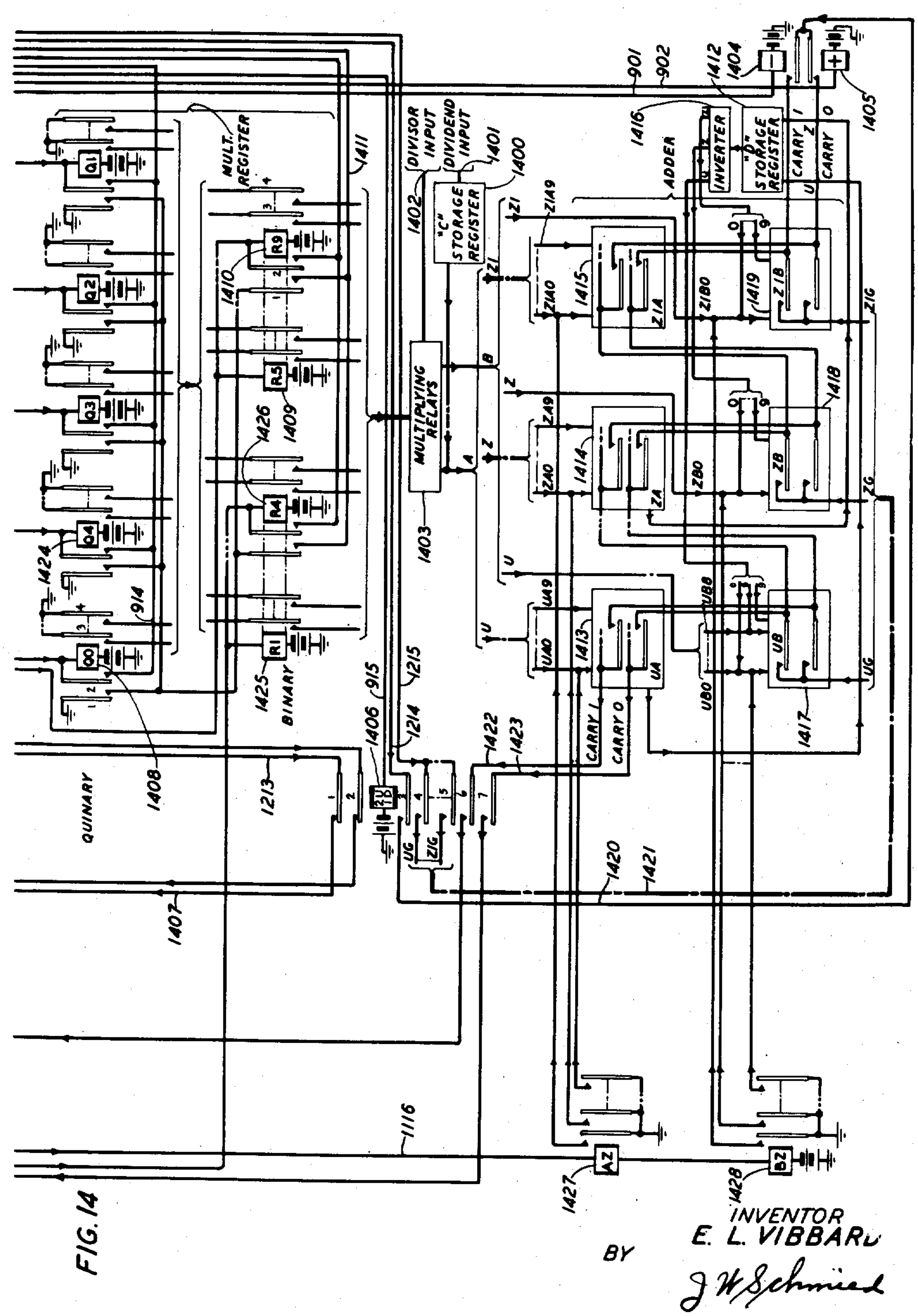
Fig. 14 is a schematic circuit drawing showing the various parts of the common calculator in order to explain its operation during an operation in division under control of the circuits of Figs. 9 to 13.

In order a visualize the advance of the steering chain relays a sequence chart showing the operation of relays S0–1 to S4–3, inclusive, in the calculation of a quotient 74,593 is presented in Fig. 7. It will be seen from this chart that when the quotient digit such as 9 or 4 is found there is at least one recycle in each group of three steering chain relays and that the number of recycles may be as many as five when the quotient digits 5 and 0 are found. The time intervals in Fig. 7 are those described in the foregoing summation of the calculating cycle and not those used for convenience in describing all the details of this cycle in Fig. 5. In Fig. 7 no attempt is made to show the movement of the relays but only to show the steps during each of which certain relays or combinations of relays are effectively operated. In this chart a numeral in each time division where the number 2 relay alone is operated shows the number which is being used as a multiplier digit. The number 0 or 1 below the trial quotient digit indicates the carry-out lead grounded in each case. It will be noted each time, after the first trial of 5 as a quotient digit, that when the carry-out changes from 0 to 1 the steering chain does not recycle but advances instead.

The operations just described may now be followed in more detail through Figs. 9 to 14. It will be assumed that in some manner a dividend has become registered in the C register 1400, either as the result of some previous calculations or as a transfer from another point here indicated as a dividend input 1401. A divisor may be supplied from some appropriate point here indicated as the divisor input 1402 and is ready to operate the multiplying relays 1403.

Now, when a dividing operation is ordered, the master control circuit will extend ground over three of the four conductors 901 to 904, respectively. Ground on conductor 901 will operate the (−) relay 1404. Conductor 902 extends to the (+) relay 1405 but will not be grounded at the same time with conductor 901. Ground on conductor 903 extends to and operates the DIV relay 1200 and ground on conductor 904 causes the operation of the Z register cut-in relay 905, connecting the Z register to the C multiple so that as the quotient digits are calculated they may be registered.

The DIV relay 1200 disconnects a lead 1202 from a multiplying lead 1201 and connects it instead to a dividing lead 1203 for a purpose which will shortly appear. The DIV relay 1200 also places ground on conductors 1204 and 1205 for purposes which will presently appear. The steering chain now having been conditioned for an operation in division through this operation of relay 1200, the calculating cycle will commence.

The operation of relay 1200 will apply ground to the chain start ground conductor 1300, through the contacts of certain relays selectively operated from the master control circuit and here indicated by the dotted line leading to armature 9 of DIV relay 1200. This ground may then be traced back through the contacts of the steering chain relays to dotted line circuit 906 representing a contact closed by the start function relay S–0 (since in division the start and end functions are invariably S0 and E5) and thence to the winding of the S0–1 relay 907. It may be noted, before proceeding, that this chain circuit is further controlled by relays auxiliary to the relays of the steering chain, which are operative only during division. Thus the chain start circuit may be traced from the normal contacts of armature 2 of the S4–2 relay 1000 over conductor 1001, the normal contacts of armature 3 of the S4–1A relay 1301, conductor 1302 to the normal contacts of armature 2 of the S4–1 relay 1002 and in similar manner through contacts of other auxiliary relays such as S0–1A, S1–1A, S2–1A, etc.

The operation of the S0–1 relay 907 starts the first calculating cycle step in which it will be remembered that the A and B registers are set by the multiplying relays and the product is summed into the D register. In this case it will be the product of the divisor by the synthetic trial quotient digit 5 as a multiplier to ascertain in which group 0 to 4, or 5 to 9 the true quotient digit will be found and to accordingly operate the proper binary relay in the V order of the Z register. This is brought about as follows.

Upon the operation of relay 907, ground on conductor 1204 is extended through the back contact and armature 1 of the CK–L relay 1206, armature 3 and back contact of the CRA–Z relay 1207, conductor 1208, armature 4 and front contact of the S0–1 relay 907, conductor 908 to operate the SO–D relay 1209. This relay locks to ground on conductor 1210 which may be traced through the normal contacts of armature 4 of relay 1207, conductor 1211, back contact and armature 4 of the S4–3 relay 1003 through similar contacts controlled by each of the number 3 relays of the steering chain, conductor 1205 to ground on armature 3 and front contact of the DIV relay 1200. This locking circuit will be closed during all of the steps of the calculating cycle except those in which the number 3 and both the number 3 and number 1 relays are operated. In the division cycle this means that this locking circuit is closed during the first seven steps in the shortest cycle where either 9 or 4 proves to be a satisfactory quotient digit. The operation of the SO–D relay 1209 will result in the application of ground to conductor 1212 which is a chain start ground circuit for the quotient digit steering chain and which will cause the operation of the first of these relays, the DS–1 relay 1100. The operation of this relay now causes the multiplier relays to be set in accordance with the first trial quotient digit, in the following manner.

A ground is extended from the back contact and armature 7 of the S1–1 relay 909, back contact and armature 6 of the S0–2 relay 910, front contact and armature 7 of the S0–1 relay 907, conductor 911, back contact and armature 1 of the RGO relay 912, conductor 913, front contact and armature 2 of the SO–D relay 1209, the S—RG lead 1213, the armature 1 and back contact of the "two up one down" relay 1406, conductor 1407, armature 8 and front contact of the DS–1 steering chain relay 1100, armature 9 and back contact of the DS–2 relay 1101, conductor 1102 to the QO multiplier relay 1408. A similar and parallel circuit may be traced from ground at the back contact and armature 8 of the S1—1 relay 909 to the winding of the binary multiplier relays 1409 to 1410 whereby the multiplier relays are set to represent the trial quotient digit 5.

The ground supplied to conductor 911 is now extended over armature 5 and front contact of the S0–1 relay 907, conductor 914, to lock the quinary multiplier relay 1408 and a similar circuit is established to lock the binary relays 1409 and 1410.

Upon the operation of the multiplier relays a ground is extended from armature 1 and front contact of relay 1408, armature 1 and front contact of relay 1410, conductor 1411 to the winding of RGO relay 912. This relay in operating opens the original circuits for the multiplier relays 1408 to 1410 but these relays now remain locked under control of the steering chain relay 907 until the calculator up-check circuit is completed to start the second step in the calculating cycle.

From the divisor input 1402, the multiplying relays 1403 are set to represent the divisor so that now the A and B registers are set and the product of five times the divisor is registered in the D register 1412. Since the C register has previously been set to represent the dividend it will be seen that shortly all four of the calculator registers will be set, whereupon in accordance with the previous description, the calculator up-check circuit will be closed and the second calculating cycle step will be started, during which both the number 1 relay 907 and the number 2 relay 910 will be operated. As relay 910 operates, the locking circuits for the multiplier relays are opened (at armatures 6 and 7 of relay 910) and since the A and B registers are not locked at this time the release of the multiplier relays will be followed by the release of the A and B registers. In accordance with previous description the S0–1 relay 907 is held locked by the down-check circuit of the A and B registers so that this relay is held up and step 2 of the calculating cycle is continued until it is proved that the A and B registers are fully released and therefore capable of being reset properly. When this occurs the S0–1 relay releases leaving "two up and one down" meaning that a number 2 relay alone such as 910 of the steering chain is up. This results in the operation of the 2U1D relay 1406 in a circuit from ground on conductor 1208 through the armature 4 and back contact of each number 1 relay such as 907, conductor 1004, the front contact and armature 4 of any number 2 relay such as 910, conductor 915 to the winding of relay 1406. The function of this relay is to allow the nature of the carry-out from the adder to be determined prior to the summing of the quantities now registered in the C and D registers and being transmitted during this step to the A and B registers, respectively, so that it may be decided whether the steering chain is to be recycled or not. The operations are therefore as follows.

It being now certain that the A and B registers are completely released, the DG and CG leads will be closed and the dividend in the C register 1400 will be transmitted to the A register represented here by its U order 1413, its Z order 1414 and its Z1 order 1415. At the same time the product of five times the divisor now registered in the D register 1412 will be passed through the inverter 1416 where it will be inverted to its complement since the (−) relay 1404 is operated and then registered in the B register here represented by its U order 1417, its Z order 1418 and its Z1 order 1419. Now since the augend element A of the adder contains the dividend and the addend element B contains the complement of five times the divisor, the addition of these two quantities will produce a remainder which will be positive if the quantity five times the divisor is less than the dividend, thereby indicating that the true quotient digit when calculated will be one of the digits 5 to 9 or which will be negative if the quantity five times the divisor is greater than the dividend thereby indicating that the true quotient digit when calculated will be one of the digits 0 to 4. As previously described, a negative number produced by summing the quantities in the A and B registers will appear as a large number probably beginning with a 9 and having a carry-out 0 while a positive number producced in the same way will appear as a small number probably beginning with a 0 and having a carry-out 1 (the probabilities here mentioned are valid since we are dealing with numbers differing only by a small amount—the carry-out values, however, are definite). Thus, as a result of this first operation a carry-out 0 will represent a negative number showing that 5 was too large for the first quotient digit whereupon an "under five" relay is operated, whereas a carry-out 1 will represent a positive number showing that 5 was too small for the first quotient digit, whereupon as "over five" relay is operated. Now it is necessary to determine which one of these relays is to be operated during this step when the number 2 steering chain relay alone is operated, so that it may be known whether to start the next calculating cycle step with the operation of the number 1 or the number 3 relay.

In multiplication operations there is no recycling in the steering chain and hence step 4 of the calculating cycle is invariably started by the operation of the number 3 relay of the chain in response to the closing of the up-check circuit of the A, B, C and D registers, which proves that the A register has been completely set from the C register and that the B register has been completely set from the D register. This, it will be remembered, results in the application of ground to armature 3 and front contact of a number 2 relay such as the S0–2 relay 910 which is connected to the winding of the next or number 3 relay such as the S0–3 relay 916. However, in the present case this normal connection has been opened through the operation of the DIV relay 1200 at its armature 4 and back contact. Hence in the present case the successful setting of the A and B registers and the consequent closing of the up-check circuit extends ground out over the front contact of armature 3 of the S0–2 relay 910 but this does not of itself have any immediate result. Although the closing of the up-check circuit gives assurance that some value is registered in each of the decimal denominational orders of the A and B registers, assurance must also be had that the carry-out has been determined and noted.

It must now be determined what the carry-out from the adder would be if the quantities in the A and B registers were added even though there is no intention of summing them at the present time. Hence the 2U1D relay 1406 extends ground from the back contacts of armatures 1 and 2 of the CRA–2 relay 1207 over conductors 1214 and 1215 to conductors 1420 and 1421. Conductor 1420 extends through the sign circuit, here represented schematically by the (−) relay 1404 and the (+) relay 1405, and grounds one of the carry-in leads to the extreme right-hand order of the adder. Conductor 1421 represents a conductor leading to each of the seven orders of the adder where the so-called local ground for producing the carry-out is supplied. In the complete description of the principles of biquinary addition set forth in the Andrews-Vibbard application, it appears that the carry-out 0 or the carry-out 1 lead is grounded, either from a so-called local ground or from one of the carry-in leads in each decimal denominational order. The operation of relay 1406 supplies these ground sources so that as soon as the A and B registers are completely set either the carry-out 1 lead 1422 or the carry-out 0 lead 1423 will be grounded. This will result in the operation of the CRO–1 relay 1103 or the CRO–0 relay 1104 and will inturn prepare for the operation of the "over five" OF relay 1105 or the "under five" UF relay 1106.

Let us assume that a carry-out 1 is produced and that consequently the CRO–1 relay 1103 is operated. The ground from armature 12 of the SO–D relay 1209 on conductor 1212 is now extended through the front contact and armature 1 of the DS–1 relay 1100, armature 5 and front contact of relay 1103 to the winding of OF relay 1105 which then locks through its armature 1 directly to conductor 1212.

Upon the operation of relay 1103, a circuit is established from ground, the front contact and armature 2 of DS–1 relay 1100, armature 3 and front contact of CRO–1 relay 1103, conductor 1107 to the winding of CRA–1 relay 1216. This relay, through its armature 5 extends the steering chain advance ground supplied over the armature 3 and front contact of the S0–2 relay as a result of the closure of the up-check circuit of the adder to the winding of the SO–1A relay 1217. This relay in operating extends the ground for its operation over the auxiliary front contact of its armature 5 to conductor 1218 leading to the winding of the SL relay 1219 which now breaks the connection at its armature 3 between the armature 2 and the winding of the S0–2 relay 910. A parallel connection between these points controlled by armature 1 and back contact of relay 1217 is also opened so that as a result of the completion of the up-check circuit of the adder and the successful establishment of a carry-out therefrom, the original circuit for the number 2 relay of the steering chain is opened.

The number 2 relay, however, is held locked by the A and B register down-check circuit. This can be seen in Fig. 4 where as long as any one of the relays in the A and B registers is operated, a ground is placed on conductor 412 and is extended thence through the armature 2 and back contact of all the auxiliary relays such as S1–1A relay 413 except that one which is operated, thence through the front contact and armature of the S0–1A relay 414 and again in series through the back contact and armature 1 of these other auxiliary relays such as S1–1A relay 413 to armature 5 and front contact of the S0–2 relay 416 to hold this relay locked. To avoid complication this down-check circuit controlled by such relays as 1217 and 1301 is not shown in Figs. 12 and 13 particularly as it is clearly shown in Fig. 4. This circuit is merely indicated in Fig. 9 by the dotted line circuit between ground and the front contact and armature 8 of the S0–2 relay 910, so that this relay will be locked under control of the A and B registers.

Now as soon as the carry-out from the adder is determined and the UF relay 1109 is operated, the binary relays of the V order of the Z register will be set as follows.

The ground placed on conductor 1202 by the cut-in relay 905 and extended by the DIV relay 1200 to conductor 1203 may now be traced over armature 4 and front contact of the CRO–1 relay 1103, armature 10 and front contact of the DS–1 relay 1100, armature 4 and front contact of OF relay 1105, the "over five" conductor 1108, armature 6 and front contact of the SO–D relay 1209, the conductor 1220 leading to the number 5 binary relay of the V order in the Z register where it is schematically represented by relay 917. Thus the binary part of the representation of the first quotient digit is determined and registered.

As a result of this a circuit is established from the ground used for the energization of the cut-in relay 905, armature 2 and front contact of relay 917, constituting a first link in the Z register up-check circuit, conductor 918, armature 6 and front contact of the SO–1A relay 1217, conductor 1221, front contact and armature 3 of the DS–1 relay 1100, the winding of the advance DAV relay 1109 and thence to battery. Relay 1109 operates and starts the next or fourth step in the division calculating cycle by causing the operation of the S0–1 relay 907 in the steering chain, over a circuit from ground, front contact and armature 1 of relay 1109, conductor 1110, front contact and armature 2 of SL relay 1219, conductor 1222, front contact and armature 4 of SO–1A relay 1217, conductor 1223 to relay 907. Hence the closure of the up-check circuit of the adder closes a ground for the advance of the steering chain and the closure of the Z register extends a ground to the number 1 relay in the steering chain thus recycling this chain.

Before proceeding with this fourth step, it should be noted that upon the operation of the DAV relay 1109 that this chain was advanced by the closure of a circuit from ground, armature 1 and front contact of SL relay 1219 (or from armature 3 and front contact of CRA–1 relay 1216) armature 3 and front contact of DAV relay 1109, armature 2 and front contact of CRO–1 relay 1103, armature 7 and front contact of DS–1 relay 1100 to the winding of DS–2 relay 1101. This relay 1101 opens the original circuit for relay 1100 but relay 1100 remains locked to the down-check circuit of relays SL and CRA–1 through its own armature 5 and front contact. Relay 1101 prepares to operate the multiplier relays to represent the digit 9 since the "over five" relay 1105 is locked up.

The fourth step in the calculating cycle is one in which the number 1 and the number 2 relays of the steering chain are concurrently operated. The "two up one down" circuit is opened by the armature 4 of relay 907 and the 2U1D relay 5906 is released to remove the grounds for the carry-out and to thus release the CRO–1 relay 1103. The operation of the S0–1 relay 907 causes the operation of the AD relay (406 in Fig. 4) whereby the CG and DG leads are opened. These are the activate leads of the C and D registers, respectively, and so when they are disconnected from ground the A and B registers which are not locked in this instance will release. When every relay in each of these registers returns to normal, then the S0–2 relay 910 will release, and thus signal the start of the fifth step of the calculating cycle.

Now when S0–2 relay 910 releases, the chain start ground is extended over the normal contacts of armature 2 of relay 910, front contact and armature 3 of the SO–1A relay 1217, the upper winding of CKL relay 1206, to cause the operation of this relay. At its armature 1 this relay 1206 opens the original energizing circuit of SO–D relay 1209 but this latter relay remains locked under control of the DIV relay 1200. At its armature 3, the CKL relay 1206 locks for a short period to ground at armature 1 of relay 1216. At its armature 4, CKL relay 1206 opens the holding ground for SO–1A relay 1217. Consequently relay 1217 releases. Relay 1216 also releases due to the movement of armature 4 of relay 1206 and SL relay 1219 releases due to the release of SO–1A relay 1217. Upon the release of relays 1216 and 1219 the ground for holding relay DS–1 operated is opened and consequently this relay releases. The circuits are now in condition to perform the operations heretofore described under step one of the calculating cycle and the remainder of this step becomes a repetition of the operations hereinbefore described, with certain minor deviations.

In this instance, since the DS–2 relay 1101 is operated, the ground extended over conductor 1407 will now be extended over armature 8 and back contact of relay 1100, armature 10 and front contact of relay 1101, armature 9 and back contact of relay 1111 and thence to Q4 multiplier relay 1424. The comparison ground will be extended over armature 9 and back contact of relay 1100, armature 12 and front contact of relay 1101, armature 11 and back contact of relay 1111, armature 2 and front contact of OF relay 1106, to binary multiplier relays 1409 and 1410, whereby the multiplier relays are set to represent the multiplier digit 9. It may be noted here that had the first operation resulted in the operation of the "under five" relay 1106, this last ground would have been extended over armature 2 and front contact of UF relay 1106 and thence to the binary multiplier relays 1425 and 1426 whereby the multiplier relays would have been set to represent the multiplier digit 4. It may further be noted that on subsequent operations when the DS–3 relay is operated the multiplier digit will be either 8 or 3, that when the DS–4 relay is operated the multiplier digit will be either 7 or 2 and so forth.

Now when the multiplier digit has been set to represent 9 as above described the same sort of operations as heretofore described will take place. If the result proves to be unsatisfactory, that is, if a carry 0 is produced then relays CRA–1 and SL will be operated as before and the principal steering chain will again be recycled.

Let us now assume that after the principal steering chain has been recycled several times the multiplier digit 6 produces a carry-out 1. Again the CRO–1 relay 1103 will be operated. This time there will be no circuit for relay CRA–1 but instead a circuit may be traced from ground, the normal contacts of armature 2 of relay 1100, front contact and armature 3 of DS–5 relay 1112, armature 1 and front contact of CRO–1 relay 1103, front contact and armature 2 of DAV relay 1109, conductor 1113 to CRA–2 relay 1207. This relay 1207 through its armature 5 establishes a normal connection between the front contact of armature 3 of S0–2 relay 910 and the winding S0–3 relay 916. Therefore the following step of the calculating cycle is similar to the fourth step in the multiplying cycle in which the number 2 and number 3 steering chain relays are concurrently operated and the number 2 relay is held locked until the C and D registers are cleared. In this case the original dividend in the C register is diminished by the product of six times the divisor and the remainder is later transferred to the C register to become the dividend for the next operation.

Since in this case the CRA–1 relay does not become operated, neither the SO–1A relay 1217 nor the SL relay 1219 become operated. The CKL relay 1206 which depends for its energization on the CRA–1 relay 1216 and the SO–1A relay 1217 does not operate on a successful trial.

When the principal steering chain advances in this manner the next quotient digit is calculated in like manner. When the fifth and last quotient digit is successfully calculated the Z register up-check circuit is completely closed, resulting in the operation of the W relay 1005 which grounds the lead 1006, whereby ground is now extended through the front contact and armature 1 of the S4–D relay 1303, conductor 1304, front contact and armature 4 of one of relays DS–2 to DS–6, back contact and armature 3 of DS–1 relay 1100 to the winding of the advance DAV relay 1109, thus causing this relay to operate. Since the CRO–1 relay 1103 is operated at this time (the calculation of the quotient digit is successfully completed when a carry 1 is produced), a circuit will be established from ground, the normal contacts of armature 2 of DS–1 relay 1100, the front contact and armature 3 of that DS relay which is now operated, armature 1 and front contact of CRO–1 relay 1103, front contact and armature 2 of DAV relay 1109, conductor 1113 to the winding of CRA–2 relay 1207. This relay through its armature 9 and front contact closes the circuit for the S4–3 relay 1003 so that upon closure of the calculator up-check circuit the END relay 1007 will operate. Following the release of the A and B registers and the release of the S4–3 relay 1003, a ground is extended to conductor 1008 and thence through the armature and front contact of the now locked up END relay 1007 to the step lead 1009 which signals the master control circuit 900 that the operation is complete. Thereupon these circuits will be released, leaving only the calculated quotient registered in the Z register for use in accordance with subsequent orders issued by the master control circuit.

Before leaving this schematic, another point should be noted. When various quotient digits are tried and it finally proves that the quotient digit will be zero, then it is a waste of time to set the multiplier digit to zero and go through the operations of multiplying the divisor by 0 for regardless of the value of the divisor each of the decimal denominational orders of both the A and B registers will be 0. Therefore, two relays AZ relay 1427 and BZ relay 1428 are provided to directly set the various orders of these registers to zero. In this particular case the UF relay 1106 would be locked up and hence after the DS–6 relay 1114 has been operated, ground applied to the SRG lead 1407 will be extended from armature 10 and front contact of DS–6 relay 1114, conductor 1115, armature 3 and front contact of UF relay 1106, conductor 1116 to operate these two zero setting relays 1427 and 1428. The AZ relay sets each denominational order of the A register to 0, the BZ relay controls the B register in like manner and the D register is therefore set to zero. In order to save time, special means are provided to register 0 in the quinary portion of the quotient digit register. Thus the ground on conductor 1202 is extended through armature 1 and front contact of DIV relay 1200, conductor 1203, armature 5 and front contact of CRO–0 relay 1104, armature 14 and back contact of DS–5 relay 1112 upon the release of this relay, the 0 conductor 1117 leading, for instance, through armature 7 of the SO–D relay 1209 to cause the automatic operation of the 0 quinary relay in the corresponding order of the Z register.

Thus the principal steering chain is surely advanced, this circuit being closed in advance of the normal circuit for this purpose resulting from the production of a carry-out 1. The remaining operations are the same as heretofore described.

*The recycle operation*

The recycle or automatic restart operation is one which takes place under a variety of conditions. Means are provided to move the master control or routine tape from any position in which it may be found to its starting point and to move the problem data tape to a position immediately before a block number. The most important of the conditions under which this automatic action takes place are:

1. When the data recorded in any of the tapes is unsatisfactory due to any of the following reasons:

*a.* There are too many holes for the symbol expected at the moment, due to incorrect perforation or due to worn tape.
*b.* There are too few holes for the symbol expected.
*c.* There is a missing steering symbol, one hole code in any one of the problem data tapes (similar to *b*).
*d.* There are insufficient or too many digits in any number.
*e.* There are insufficient numbers to satisfy a formula.
*f.* Tape transmitter fails to advance or skips a code.

2. When checking circuits indicated that an insufficient number of relays has operated, attributable to equipment troubles.

3. When over-registration circuits indicate that too many relays have operated.

*a.* In any of the registers.
*b.* In the calculator setting circuits.
*c.* In the control circuits.
*d.* During calculation.

4. After power is restored following a power failure.

5. After a fuse has been replaced.

6. When a "missing data" symbol is encountered in a problem data tape.

7. In class 1 operations where calculations call for a block number in the tape in the interpolator tape transmitter lower in number than any such number recorded therein. This will occur at the beginning of a problem.

8. In class 2 operations where calculations call for a block number in the tape in the interpolator tape transmitter higher in number than any such number recorded therein. This will occur at the end of the problem.

9. When the five-hole (end of cycle) code is encountered on the master tape as a signal that the cycle has been completed.

10. When the R–BK key is operated and then released. The "release block" key is used to prevent the automatic recycle of the apparatus when a trouble occurs, that is, this key is operated to "freeze" the circuits so that a trouble may be traced. When this key is restored the master control circuit will be recycled. Therefore, the R–BK key is a very convenient recycle means by which the device may be recycled by a manual operation.

11. After the automatic check of preliminary data on the tapes which go in the problem data transmitter and the interpolator transmitter. If the data on these two tapes correspond, the transmitters are advanced and the master control circuit is recycled—in this case—started on its calculating operations.

Figures 16, 17:
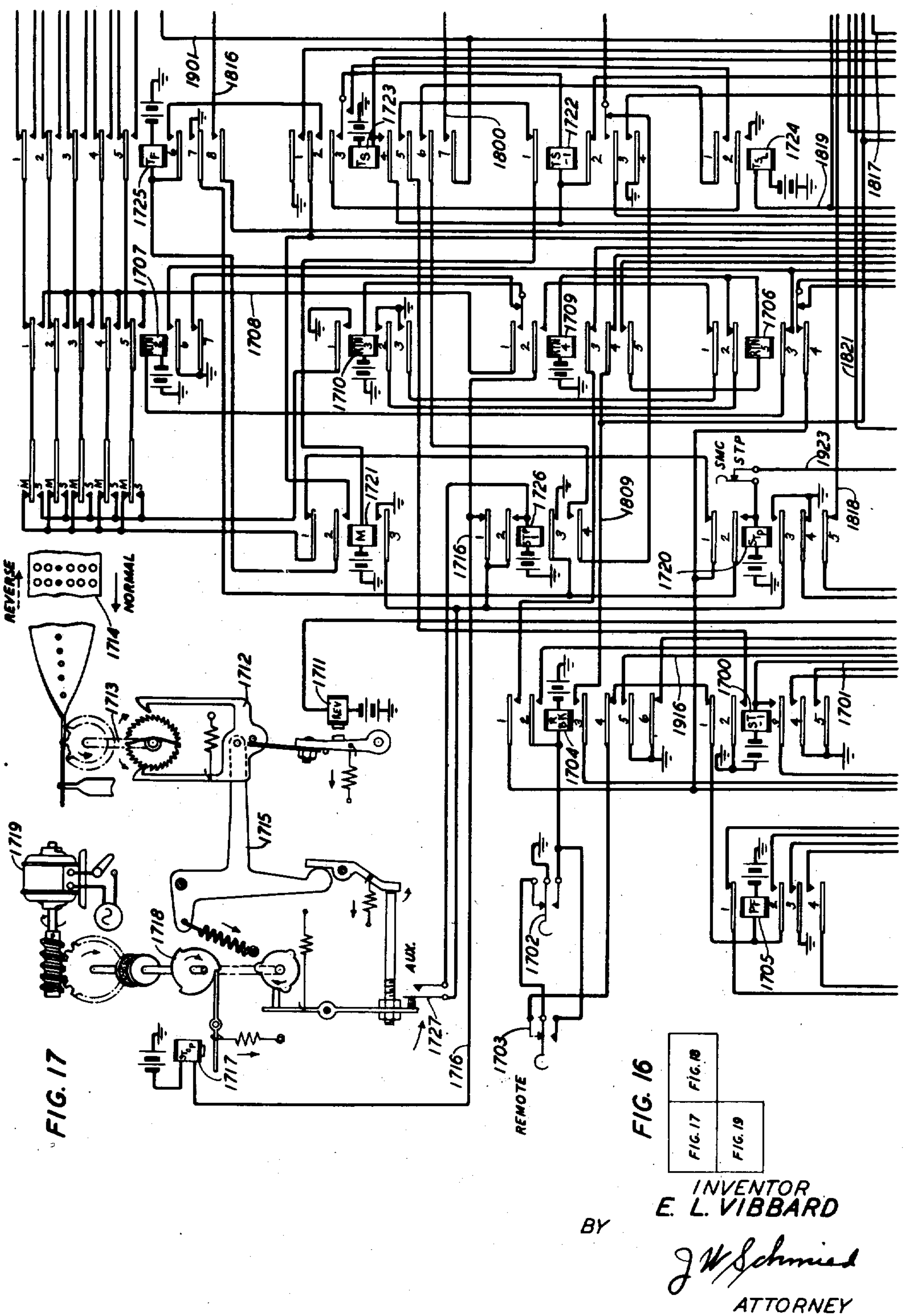
Figure 18:
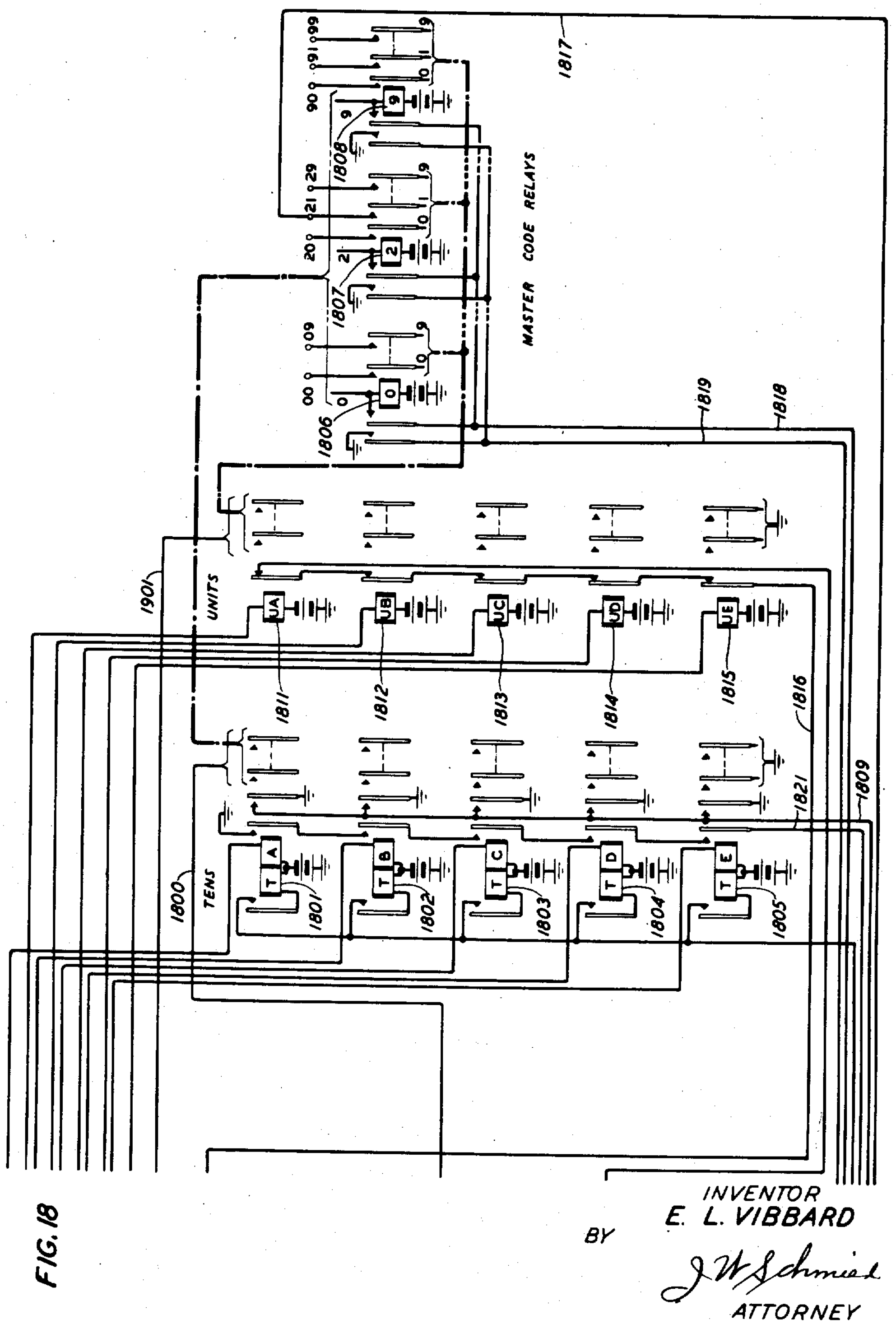
Fig. 18 shows the tens and units relays operated by the transmitter and indicates the code relays whereby any one of one hundred code leads may be selected by a two-digit code.
Figure 19:
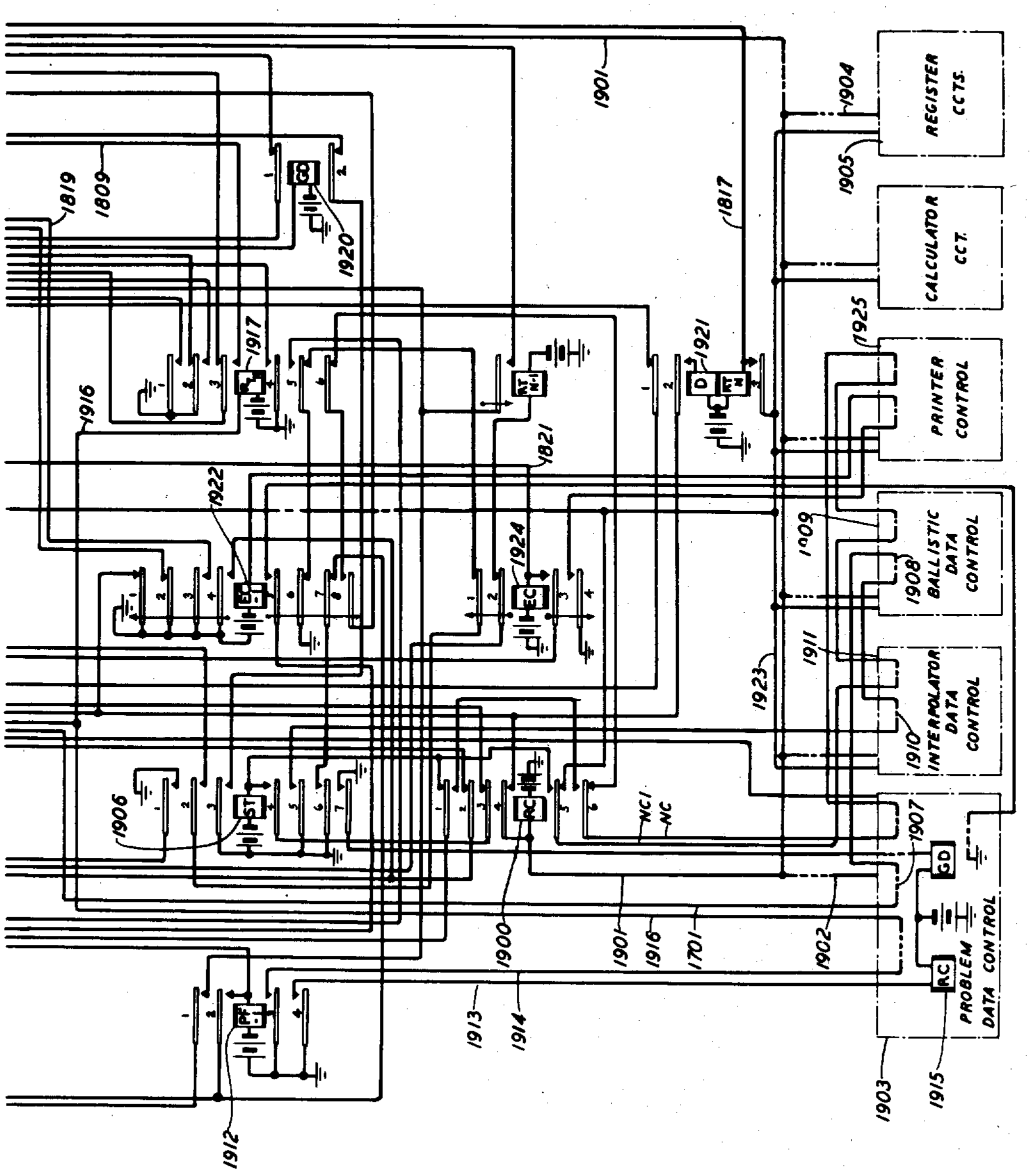

The recycle operation is started by the operation of a particular relay whose winding may be energized from a plurality of sources, all of which need not be explained in detail here, for the principle of operation is the same in each case. In the schematic shown in Figs. 17, 18 and 19 (arranged as indicated in Fig. 16) the RC relay 1900 is known as the recycle relay and may be operated over conductor 1901 from any of its branches as, for instance, the branch 1902 leading in from the problem data control circuit 1903 or the branch 1904 leading in from the register circuits 1905. For the present purposes, it is sufficient to say that the operation of the recycle relay is akin to the operation of a general release relay since it opens a number of locking circuits and releases a number of relays which can only be operated again when the routine operations are those performed at the beginning of a cycle. For instance, the operation of relay 1900 from the application of ground to conductor 1901, opens both the original and the locking circuit for the ST relay 1906 and this in turn causes the release of the ST–1 relay 1700 by opening its circuit. The ST–1 relay cannot again operate until certain given conditions in other circuits are satisfactory. This is indicated by the operating conductor 1701 in its path through the circuit 1907 in the problem data control circuit 1903, circuit 1908 in the ballistic data control circuit 1909, circuit 1910 in the interpolator data control circuit 1911 and so forth. Hence the proper starting conditions must be attained in each of the dependent circuits before the specific start relay 1700 is again operated.

When the RC relay 1900 operates it locks to ground supplied by the armature 1 and back contact of the EC–1 relay 1922 and thus will remain locked until the master tape has passed the end of its cycle of routine orders and is ready to start a new cycle. The release of the ST–1 relay 1700 closes a circuit from ground, the normal contacts of the R–BK key 1702, the normal contacts of the remote R–BK key 1703, armature 4 and back contact of R–BY relay 1704, back contact and armature 1 of ST–1 relay 1700, winding of PF relay 1705 to battery. Relay 1705 in operating closes the NC (new course) circuit, from ground armature 3 and front contact of PF relay 1705, armature 1 and front contact of RC relay 1900 and front contact and armature 6 of RC relay 1900 thence through the NC circuit which may be traced in series through the problem data control circuit 1903, the printer control circuit, the ballistic data control circuit 1909, the interpolator data control circuit 1911, the armature 5 and front contact of the RC relay 1900 and thence to the winding of the ST relay 1906. Thus the reoperation of the start relay 1906 awaits the establishment of certain given conditions in the various elements of the device which conditions will result in the closure of this NC circuit. This is brought about by the operation of the PF–1 relay which operates the recycle relays in the various parts to drive the transmitters there to their starting positions and otherwise prepare the circuits for proper operation. Upon the operation of ST relay 1906 a circuit is established from ground armature 6 and front contact of relay 1906, armature 7 and back contact of EC–1 relay 1922, armature 4 and front contact of PF relay 1705, winding of PF–1 relay 1912 to battery. Relay 1912 operates and locks over its front contact and armature 2 to this ground and will thus remain operated under control of the EC–1 relay 1922. The PF–1 relay 1912 closes ground, by way of example to the problem data control circuit recycle relay 1915 so as to drive the problem data tape to its next block number. When the circuits there have become properly adjusted the ground from armature 3 and front contact of the PF–1 relay 1912 is extended to conductor 1916 to start the return movement of the master or routine tape 1714 to its starting point.

When the problem data control circuit has been properly recycled and the other circuits have been put in proper condition then ground on armature 5 of ST relay 1906 will be extended over the circuits 1910, 1908 and 1907 to the winding of the ST–1 relay 1700, allowing the PF relay 1705 to release and closing the starting circuit for the master tape transmitter. A circuit may now be traced from ground, armature 6 and back contact EC–1 relay 1922, armature 5 and front contact of RTN relay 1917, back contact and armature 1 of PF relay 1705, armature 1 and front contact of PF–1 relay 1912, back contact and armature 3 of RTN–5 relay 1706, the winding of RTN–2 relay 1707 to battery. Relay 1707 operates to primarily disconnect the transmitter fingers from their code responsive relays (in Fig. 18) and to connect them all to conductor 1708. Through its armature 7, relay 1707 extends ground through the normal contacts of armature 1 of RTN–4 relay 1709, the winding of RTN–3 relay 1710 to battery. Relay 1710 operates and through its armature 1 places ground on the five transmitter spacing contacts so that as long as any single one of the transmitter fingers rests on a spacing contact a ground will be found on conductor 1708 to lock RTN–3 relay 1710 in its operated position in a circuit which will shortly appear. Relay 1710, through its armature 2 extends ground to armature 2, back contact and the right-hand terminal of RTN–5 relay 1706 and thence to the winding of RTN–4 relay 1709. As long as ground is maintained on this armature 2 of relay 1706, relay 1706 cannot operate. Relay RTN–4 operates and besides closing the locking circuit for RTN–3 relay 1710, extends ground from armature 2 of RTN relay 1917 through front contact and armature 5 of relay 1709 to the left-hand terminal of RTN–5 relay 1706. Thus it will be seen that in the following movement of the tape, ground will be maintained on the transmitter spacing contacts until a five-hole code is found, whereupon RTN–3 relay 1710 will release and RTN–5 relay 1706 will operate in series with RTN–4 relay 1709.

Now it may be noted that through its armature 1 the RTN relay 1917 extends ground over the normal contacts of armature 4 of RTN–5 relay 1706, back contact and armature 1 of D–RTN relay 1921 to the winding of reverse magnet 1711. It is believed to be clear from the drawing that the operation of magnet 1711 will cause the right-hand pawl of the ratchet 1712 to engage a ratchet wheel which will turn the shaft 1713 in a reverse direction (under control of the lever 1715) to move the tape 1714 in a reverse direction.

During the operation of RTN–4 relay 1709 and before relay 1706 is operated, a ground may be traced from the front contact and armature 3 of RTN–3 relay 1710, the armature 1 and back contact of RTN–5 relay 1706, front contact and armature 2 of RTN–4 relay 1709, conductor 1716, winding of tape stop magnet 1717 to battery. Magnet 1717 operates, removes the stop from the cam 1718 and allows the transmitter to start a continuous operation under control of the motor 1719, thus moving the tape 1714 continuously until a five-hole code (at least one of which is recorded in the tape at the starting position) is encountered. At this time, ground being removed from conductor 1708, relay 1710 will release, relay 1706 will operate in series with relay 1709 and the circuit of the stop magnet 1717 will be interrupted so that the transmitter will come to rest with all five of its fingers on a marking contact. The operation of relay 1706 releases RTN–2 relay 1707 so that the transmitter fingers are now connected to the tens relays 1801 to 1805, inclusive. Ground may then be traced from armature 1 and front contact of RTN relay 1917, front contact and armature 4 of RTN-5 relay 1706, back contact and armature 1 of STP relay 1720, back contact and armature 1 of M relay 1721, to the marking contacts of the master tape transmitter, to now operate all five of the relays 1801 to 1805.

The right-hand armatures of these relays control several circuits, one to operate the master code relays represented by relays 1806, 1807 and 1808 and another which will indicate that three and three only of these transmitter relays have operated. If anything other than three and three only are operated (excepting five or none) then conductor 1800 will be grounded and the master control circuit will be recycled. The operation of any one of these tens relays will ground conductor 1809 for purposes which will appear hereinafter. In the present case the tape 1714 having been driven to a five-hole code, all five of the relays 1801 to 1805 become energized and a series circuit is closed from ground to conductor 1821 to operate the EC relay 1924. This end of cycle relay 1924 operates and locks to the back contact and armature 4 of STP relay 1720. Relay 1924 also closes a circuit from its armature 4 and front contact through a circuit in the printer control circuit 1925 to the winding of the EC–1 relay 1922. Assuming that the circuit in the printer control circuit is closed, then the EC–1 relay 1922 will operate and thereby release the RC relay 1900. A circuit is now established from ground, armature 3 and front contact of EC–1 relay 1922 over conductor 1819 (in substitution of a ground under normal operation supplied to conductor 1819 by any one of the master code relays 1806 to 1808) to the winding of TSL relay 1724, for purposes which will shortly appear. By its armature 4 and front contact EC–1 relay 1922 substitutes a ground for the marking contact circuit of the transmitter which originally came from the RTN relay 1917 but which will now be released. By movement of its armature 7 the EC–1 relay 1922 releases the PF–1 relay 1705 and this removes the original operating grounds for the recycle relays in the other control circuits such as the RC relay 1915 in the problem data control circuit 1903. PF–1 relay 1912 will also remove ground from conductor 1916 to release the RTN relay 1917. Relay 1917 in turn releases relays 1706 and 1709 whereupon a circuit may be traced from ground on conductor 1809 over armature 4 and back contact of RTN–4 relay 1709, armature 3 and back contact of RTN relay 1917, back contact and armature 2 of TS–1 relay 1722, armature 1 and back contact of GD relay 1920, the winding of TS relay 1723 to battery. Relay 1723 operates and locks in a circuit which will not be affected by armature 1 of GD relay 1920. Any one of the code relays 1806, 1807 or 1808 will now substitute a ground on conductor 1819 to operate TSL relay 1724, and this relay through its armature 2 will supply a ground to the right-hand terminal of TS–1 relay 1722 but relay 1722 cannot operate until the ground on its left-hand terminal is removed. The tens relays now having functioned properly may be released. Therefore, a circuit may be traced from ground, armature 2 and front contact of ST–1 relay 1700, armature 5 and front contact of TS relay 1723, back contact and armature 1 of TS–1 relay 1722, winding of M relay 1721 to battery. Relay 1721 removes ground from the marking contacts of the transmitter to open the original energizing circuits of the tens relays, and closes a circuit for the transfer TF relay 1725 which may be traced from the armature 2 and back contact of RTN relay 1917 through armature 2 and front contact of M relay 1721. Relay 1725 transfers the transmitter finger circuits from the tens relay to the units relays, and locks in a circuit which shunts armature 2 and front contact of M relay 1721.

The M relay 1721, when it operated, closed a circuit for the transmitter stop magnet 1717, over a circuit from ground, front contact and armature 3 of relay 1721, back contact and armature 1 of STP–1 relay 1726, conductor 1716 to stop magnet 1717. The transmitter will take one step forward. As it starts on this movement its auxiliary contacts 1727 will extend the ground from armature 3 of M relay 1721 to the winding of STP–1 relay 1726 which will lock to the M relay and open the circuit for magnet 1717. Upon the operation of STP–1 relay 1726 a circuit is closed from ground, the front contact and armature of TSL relay 1724, armature 3 and auxiliary front contact of TS relay 1723, front contact and armature 1 of TSL relay 1724, front contact and armature 6 of TS relay 1723, front contact and armature 4 of STP–1 relay 1726, normal contacts of armature 3 of TS–1 relay 1722, the back contact and armature in series of each of the units relays 1811 to 1815, inclusive, conductor 1816, front contact and armature 8 of TF relay 1725, to the winding of GD relay 1920. Relay 1920 opens the locking circuit for the tens relays and they all release, whereby the ground on the back contact of armature 2 of TS–1 relay 1722 is removed and this relay now operates in series with TS relay 1723.

As soon as the TS–1 relay 1722 operates the circuit for the M relay 1721 will be opened and relay 1721 will again close the ground to the transmitter marking contacts so that the units relays may be operated in accordance with the code to which the transmitter has now moved the tape. The release of the M relay 1721 allows the STP–1 relay to release. However, the operation of the units relays at this time after a five-hole code has been read into the tens relays is without effect. The next movement of the tape transmitter is controlled by the NC circuit regardless of what response the units relays make. It is usual practice to have but a single five-hole code in the master tape and this is followed by a blank. However, there may be any number of such five-hole codes so long as the number is uneven whereby the blank code is always read off to the units relays. This blank is known as a priming operation code since the further operations depend upon the closure of the NC circuit as assurance that the rest of the calculating device circuits are in proper condition to proceed. Therefore a circuit may be traced from ground, armature 4 and front contact of TS–1 relay 1722, armature 8 and front contact of EC–1 relay 1922, armature 6 and back contact of RTN relay 1917, back contact and armature 6 of RC relay 1900 over the NC circuit hereinbefore described, armature 5 and back contact of RC relay 1900, the STP conductor 1923, to the winding of the STP relay 1720. The operation of relay 1720 closes a circuit from ground front contact and armature 3 of STP relay 1720, armature 1 and back contact of STP–1 relay 1726 to the conductor 1716 leading to the stop magnet. Again, the transmitter will move the tape forward one step and if it is the priming or blank code from which it has just stepped it will now move the tens code of the first routine or master code under the transmitter fingers for transmission. The operation of the STP relay 1720 opens the holding circuit of the EC relay 1924 and the release of this relay is followed by the release of the EC–1 relay 1922 placing this master control circuit in normal condition.

As the transmitter moves the STP–1 relay operates as before and at its armature 3 opens the holding circuit of the STP relay 1720. The release of STP relay 1720 opens the locking circuit for the STP–1 relay 1726 so that as the movement of the transmitter comes to a stop the fingers will explore the tape and read off the first code recorded therein at the beginning of the routine cycle.

The circuit conditions now attained will be maintained until the grounding of a code wire such as 1817 has completed its function whereupon a satisfaction signal is transmitted to this circuit to cause an advance in the circuit operation.

In the present case the master code which results in the grounding of conductor 1817 is known as the RTN code, is recorded mid-way in the length of the master or routine tape and is provided for the purpose of conditioning the master control circuit so that when and if the master control circuit is recycled the master tape will return to its starting point over the shortest route. In the description hereinbefore given it was stated that on a recycle the reverse magnet 1711 was energized so that the tape was moved backwardly. Such an operation will take place when and if the recycle relay 1900 is operated any time before the mid-point of the tape has been reached.

Now let us suppose the mid-point of the tape has been reached and the RTN master code recorded there is transmitted, resulting in the grounding of the code wire 1817. As a result the D–RTN relay 1921 is energized. While the conductor 1817 is grounded this ground will be extended over the front contact and armature 3 of D–RTN relay 1921 to the STP conductor 1923 leading to the STP relay 1720, which will thereupon ground the conductor 1716, leading to the stop magnet 1717. The grounding of the STP conductor 1923 constitutes a satisfaction signal and indicates that the operation ordered by the RTN master code has been satisfactorily carried out, in this case the operation of the D–RTN relay 1921. Relay 1921 locks through its upper winding to the back contact and armature 1 of the EC–1 relay 1922 and will thus remain energized until the end of the cycle has been reached in a normal manner. Under these conditions the operation of D–RTN relay 1921 is without effect.

The STP relay 1720 locks to the back contact of armature 3 of STP–1 relay 1726. Relay 1720 also opens the ground wire to the transmitter marking contacts so that the units relays are released. Relay 1720 at its armature 5 also opens the locking circuit 1818 of the code relays so that the operated one of these relays releases. As a result ground is removed from conductor 1819 and the TSL relay 1724 releases, in turn releasing the TS relay 1723 and the TS–1 relay 1722. The TF relay 1725 is released when TS relay 1723 returns to normal.

Thus the M relay 1721 is employed to step the transmitter from the tens to the units code of a master code and the STP relay 1720 is employed to step the transmitter from the units code of one master code to the tens code of the next. In addition the STP relay 1720 clears the circuit and makes it ready to respond properly to another such code.

In the present instance it has been shown that the RTN code (21) recorded at the mid-point of the master or routine tape has caused the operation of the D–RTN relay 1921. Now if any one of the conditions calling for a recycle operation occurs it will be found that the circuit for the reverse magnet 1711 has been opened so that the tape is driven forwardly to its starting point instead of backwardly as hereinbefore described. In this manner means responsive to indicia mid-way in the master or routine tape are provided to cause such tape to return to its starting point over the shortest route.

Figure 20:
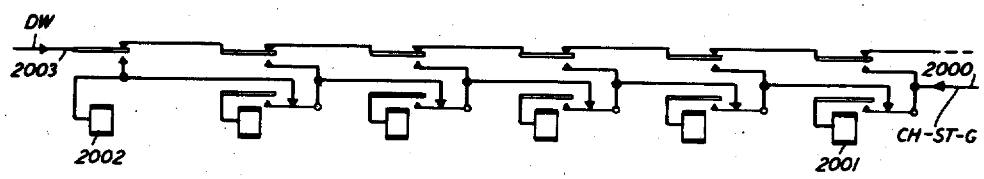
Fig. 20 is a circuit diagram showing in highly schematic form the condition of two control circuits within the steering chain when all relays thereof are in normal position.
Figure 21:
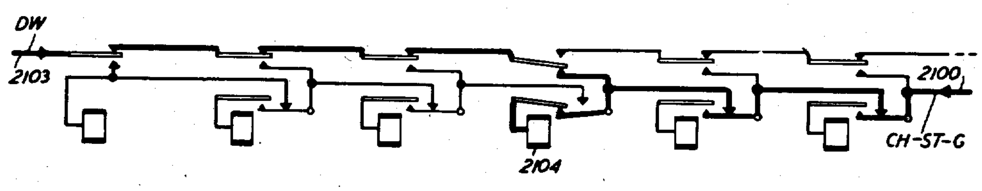
Fig. 21 is a similar circuit showing the condition of these two circuits when a single steering relay has been operated.
Figure 22:
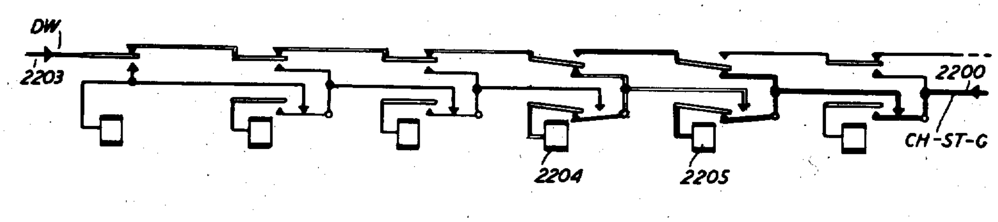
Fig. 22 is a similar circuit showing the condition of these two circuits when two steering relays are operated simultaneously.

The three Figures 20, 21 and 22 show graphically the use of the chain start ground circuit and the down-check circuit. In Fig. 20 a plurality of (six) steering chain relays are shown each in its released position. The chain start ground lead 2000 enters the chain at the contacts of the highest numbered steering chain relay 2001 and extend through a series circuit to the lowest numbered relay 2002. The down-check circuit 2003 enters the chain at the contacts of the lowest numbered relay 2002 and emerges at the contacts of the highest numbered relay 2001 extending therefrom to some other point of use with which we are not here concerned. In this arrangement the two circuits are entirely separated from each other.

In Fig. 21 the condition is shown where some one of the steering chain relays has become operated, say relay 2104. Now the ground supplied over the chain start ground circuit 2100 extends to and holds relay 2104 operated and is also extended to the down-check circuit 2103, the effective path now being shown by a heavy line. Almost immediately, as has been described hereinbefore a ground is returned over the down-check lead 2103 which helps hold the relay 2104 for a purpose which is made clear in the following Fig. 22. Here a succeeding steering chain relay 2205 has become operated. Now the chain start ground is used to hold the newly operated relay 2205 and the other relay 2204 is held by the down-check circuit, the two circuits being entirely separated from each other. In this way the relay 2204 may be maintained in operation (over the double line circuit) until it is assured that its functions have been entirely completed (signalled by the removal of ground from the down-check circuit) despite the fact that a succeeding relay of the chain has opened the chain start ground circuit to its winding.

What is claimed is:

1. In a tape-controlled calculator, a master tape containing indicia for controlling the pattern of operation of said calculator, said master tape being in the form of a loop and having a start position indicator and a mid-point indicator thereon, said mid-point indicator being located on said tape one-half the circumferential length of said tape from said start position indicator, a tape driving means, recycle means for conditioning said calculator for a new calculation and means controlled by said recycle means and responsive to said mid-point indicator for controlling said driving means to drive said tape to said start position indicator.

2. In a tape-controlled calculator, a master tape on which is recorded indicia for controlling the pattern of operation of said calculator, said master tape being in the form of an endless loop and having a start position indicator and a mid-point indicator thereon, said mid-point indicator being located on said tape one-half the circumferential length of said tape from said start position indicator, a tape driving means arranged to drive said tape forwardly or backwardly, recycle means for setting said calculator to zero in preparation for a new calculation, means controlled by said recycle means for controlling said tape driving means to drive said tape backwardly to said start position indicator and means controlled by said recycle means and responsive to said mid-point indicator for controlling said tape driving means to drive said tape forwardly to said start position indicator.

3. In a tape-controlled calculator, a master tape for controlling the pattern of operation of said calculator, said master tape being in the form of an endless loop and having control indicia including a start position indicia and a mid-point indicia therein, said indicia being in the form of coded perforations in said tape, said mid-point indicia being located on said tape one-half the circumferential length of said tape from said start position indicia, sensing means for sensing said indicia, control devices responsive to said indicia including a control device responsive to said start position indicia and a control device responsive to said mid-point indicia, a code transmitter controlled by said sensing means for transmitting signals to the control devices indicated by said indicia, a tape driving means arranged to drive said tape through said transmitter either forwardly or backwardly, recycle means for resetting said calculator to zero in preparation for a new calculation, means controlled by said recycle means for controlling said tape driving means to drive said tape backwardly through said transmitter, means controlled by said recycle means and by said control device responsive to said mid-point indicia for controlling said tape driving means to drive said tape forwardly through said transmitter and means controlled by said recycle means and said control device responsive to said start position indicia for halting the movement of said tape through said transmiter at said start position indicia.

4. In a calculator, a master index for controlling the pattern of operation of said calculator, said master index being in the form of an endless tape having controlling indicia recorded thereon, said controlling indicia including a start position indicia and a middle position indicia, said middle position indicia being located on said tape one-half the circumferential length of said tape from said start position indicia, driving means for moving said tape forwardly during a calculation operation of said calculator and either forwardly or backwardly during a recycle operation of said calculator, recycle means for conditioning said calculator for a new calculation operation, means controlled by said recycle means for controlling said driving means to move said tape backwardly to said start position indicia and means controlled by said recycle means and responsive to said middle position indicia for controlling said driving means to move said tape forwardly to said start position indicia.

5. In a tape-controlled calculator, a master tape containing indicia for controlling the pattern of operation of said calculator, said master tape being in the form of an endless loop and having a start position indicium and a mid-point indicium therein, said mid-point indicium being located on said tape one-half the circumferential length of said tape from said start position indicia, sensing means for sensing said indicium, control means controlled by said sensing means, recycle means for conditioning said calculator for a new calculation, a tape driving means controlled by said control means and said recycle means for selectively driving said tape either in a first or a second direction to said start position indicium.

6. In a tape-controlled calculator, a master tape for controlling the pattern of operation of said calculator, said master tape being in the form of an endless loop and having control indicia in the form of coded perforations, said control indicia including a start position indicium and a mid-point indicium, a code transmitter including a sensing means for translating said control indicia, said start position indicium and said mid-point indicium into signals, said transmitter having a means for transmitting said signals to control devices indicated by said indicia including a control device indicated by said start position indicium and a control device indicated by said mid-point indicium, a tape driving means for moving said tape forwardly in an intermittent step-by-step manner during calculating operations of said calculator and either forwardly or backwardly in a continuous manner during a recycling operation of said calculator, recycle means for resetting said calculator to zero in preparation for a new calculation, means controlled by said recycle means for controlling said tape driving means to drive said tape backwardly to said start position indicium, means controlled by said recycle means and said control device indicated by said mid-point indicium for controlling said tape driving means to drive said tape forwardly to said start position indicium and means controlled by said control device indicated by said start position indicium for halting further movement of said tape at said start position indicium.

7. In a tape-controlled calculator, a master tape for controlling the pattern of operation of said calculator, said master tape being in the form of an endless loop and having a start position indicator and a movement direction indicator therein, a tape driving means arranged to drive said tape forwardly or backwardly, recycle means for conditioning said calculator for a new calculation, means controlled by said recycle means and responsive to said movement direction indicator for controlling said tape driving means to selectively drive said tape in the direction of the shortest distance to said start position indicator and means controlled by said recycle means and said start position indicator for controlling said tape driving means to halt the movement of said tape at said start position indicator.

8. In a tape-controlled calculator, a master tape for controlling the pattern of operation of said calculator, said master tape being in the form of an endless loop and having a start position indicator and a movement direction indicator thereon, a tape driving means, recycle means for resetting said calculator to zero in preparation for a new calculation, means responsive to said recycle means and said movement direction indicator for controlling said driving means to drive said tape to said start position indicator.

9. In a tape-controlled calculator, a master tape on which is recorded indicia for controlling the pattern of operation of said calculator, said master tape being in the form of an endless loop and having a start position indicator and an intermediate point indicator therein, a tape driving means arranged for intermittent step-by-step forward operation and for continuous forward or reverse operation, recycle means for resetting said calculator to zero in preparation for a new calculation and means controlled by said recycle means and said intermediate point indicator for controlling said tape driving means to drive said tape continuously to said start position indicator in the direction of the shortest distance to said start position indicator.

10. In a calculator, a master index for controlling the pattern of operation of said calculator, said master index being in the form of an endless tape having controlling indicia recorded thereon, said controlling indicia including a start position indicia, an end position indicia and an intermediate position indicia, said intermediate position indicia being located on said tape intermediate between said start position indicia and said end position indicia, driving means for moving said tape forwardly during the calculating operations of said calculator and either forwardly or backwardly during a recycling operation of said calculator, recycle means for resetting said calculator to zero in preparation for a new calculation, means controlled by said recycle means and responsive to said intermediate position indicia for determining the direction of movement of said tape during a recycling operation of said calculator, said last-named means controlling said tape driving means to drive said tape to said start position indicia in the direction of the shortest distance to said start position indcia.

11. In a tape-controlled calculator, a tape for controlling the operation of said calculator, said tape having a start position indicator thereon, a tape driving means, recycle means for conditioning said calculator for a new calculation, means controlled by said recycle means for controlling said tape driving means to drive said tape to said start position indicator.

12. In a tape-controlled calculator, a master tape for controlling the pattern of operation of said calculator, said master tape having control indicia including a start position indicium thereon, a tape driving means, recycle means for setting said calculator to zero in preparation for a new calculation and means controlled by said recycle means for controlling said tape driving means to drive said tape to said start position indicium.

13. In a tape-controlled calculator, a master tape for controlling the pattern of operation of said calculator, said master tape having control indicia including a start position indicia thereon, said indicia being in the form of coded perforations in said tape, sensing means for sensing said indicia, control devices responsive to said indicia including a control device responsive to said start position indicia, a code transmitter controlled by said sensing means for transmitting signals to the control devices indicated by said indicia, a tape driving means arranged to drive said tape through said sensing means, recycle means for setting said calculator to zero in preparation for a new calculation, means controlled by said recycle means for energizing said tape driving means to drive said tape and means controlled by said recycle means and said control device responsive to said start position indicia for controlling said tape driving means to halt the movement of said tape at said start position indicia.

References Cited in the file of this patent

UNITED STATES PATENTS

| | | |
|---|---|---|
| 1,962,731 | Bryce | June 12, 1934 |
| 2,519,725 | White | Aug. 22, 1950 |
| 2,580,768 | Hamilton | Jan. 1, 1952 |
| 2,616,626 | Lake | Nov. 4, 1952 |